United States Patent [19]

Hashimoto

[11] Patent Number: 4,745,549
[45] Date of Patent: May 17, 1988

[54] METHOD OF AND APPARATUS FOR OPTIMAL SCHEDULING OF TELEVISION PROGRAMMING TO MAXIMIZE CUSTOMER SATISFACTION

[75] Inventor: Kazuo Hashimoto, Tokyo, Japan

[73] Assignee: Hashimoto Corporation, Tokyo, Japan

[21] Appl. No.: 871,549

[22] Filed: Jun. 6, 1986

[30] Foreign Application Priority Data

Jun. 11, 1985 [JP] Japan .................. 60-126432

[51] Int. Cl.$^4$ ............... G06F 15/46; H04N 7/02; H04N 7/10
[52] U.S. Cl. ................... 364/402; 358/84
[58] Field of Search ........... 364/402; 358/84, 86; 179/2 AS

[56] References Cited

U.S. PATENT DOCUMENTS

| | | | |
|---|---|---|---|
| 3,639,686 | 2/1972 | Walker et al. | 358/86 |
| 3,947,624 | 3/1976 | Miyake | 358/84 |
| 4,170,782 | 10/1979 | Miller | 358/84 |
| 4,210,962 | 7/1980 | Marsh et al. | 364/402 |
| 4,258,386 | 3/1981 | Cheung | 358/84 |
| 4,331,974 | 5/1982 | Cogswell et al. | 358/86 |
| 4,546,382 | 10/1985 | McKenna et al. | 358/84 |
| 4,573,072 | 2/1986 | Freeman | 358/86 |
| 4,602,279 | 7/1986 | Freeman | 358/86 |
| 4,603,232 | 7/1986 | Kurland et al. | 175/2 AS |

FOREIGN PATENT DOCUMENTS

3417417 9/1985 Fed. Rep. of Germany ...... 364/402

*Primary Examiner*—Jerry Smith
*Assistant Examiner*—Charles B. Meyer
*Attorney, Agent, or Firm*—Lowe, Price, LeBlanc, Becker & Shur

[57] ABSTRACT

In a method and apparatus for extracting programs suitable for individual subscriber taste from among all available television programs and for editing an individual subscriber television program list, objective data is statistically processed by linear programming. The processed results are input to a computer and are stored on a hard disk. The storage contents are read out from the hard disk and are printed out. Subscriber complaints about the program list are periodically fed back to improve prediction precision, thereby providing an automatic controller attuned to subscriber taste when the individual subscriber program list is used to automatically control a TV or VTR.

3 Claims, 12 Drawing Sheets

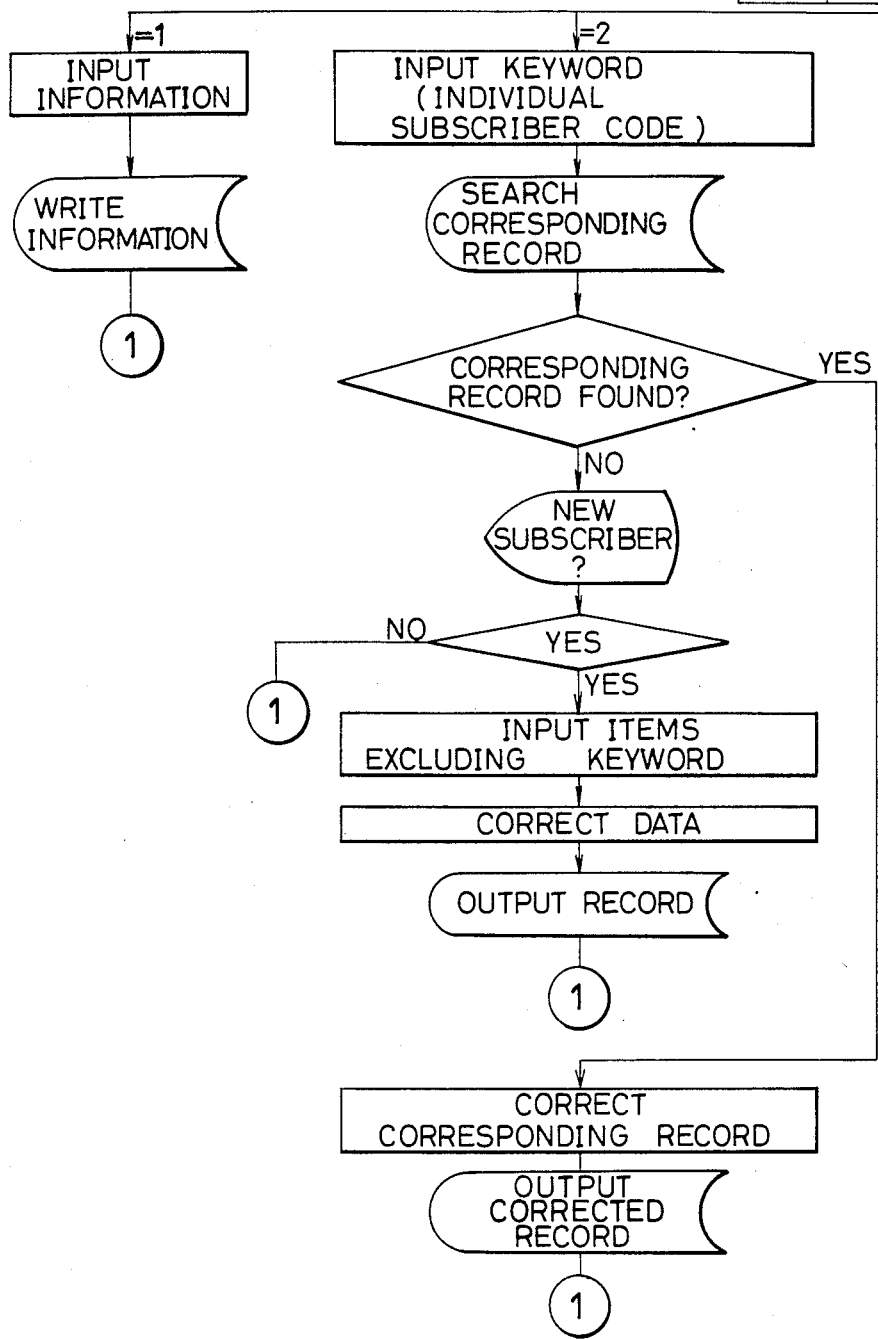

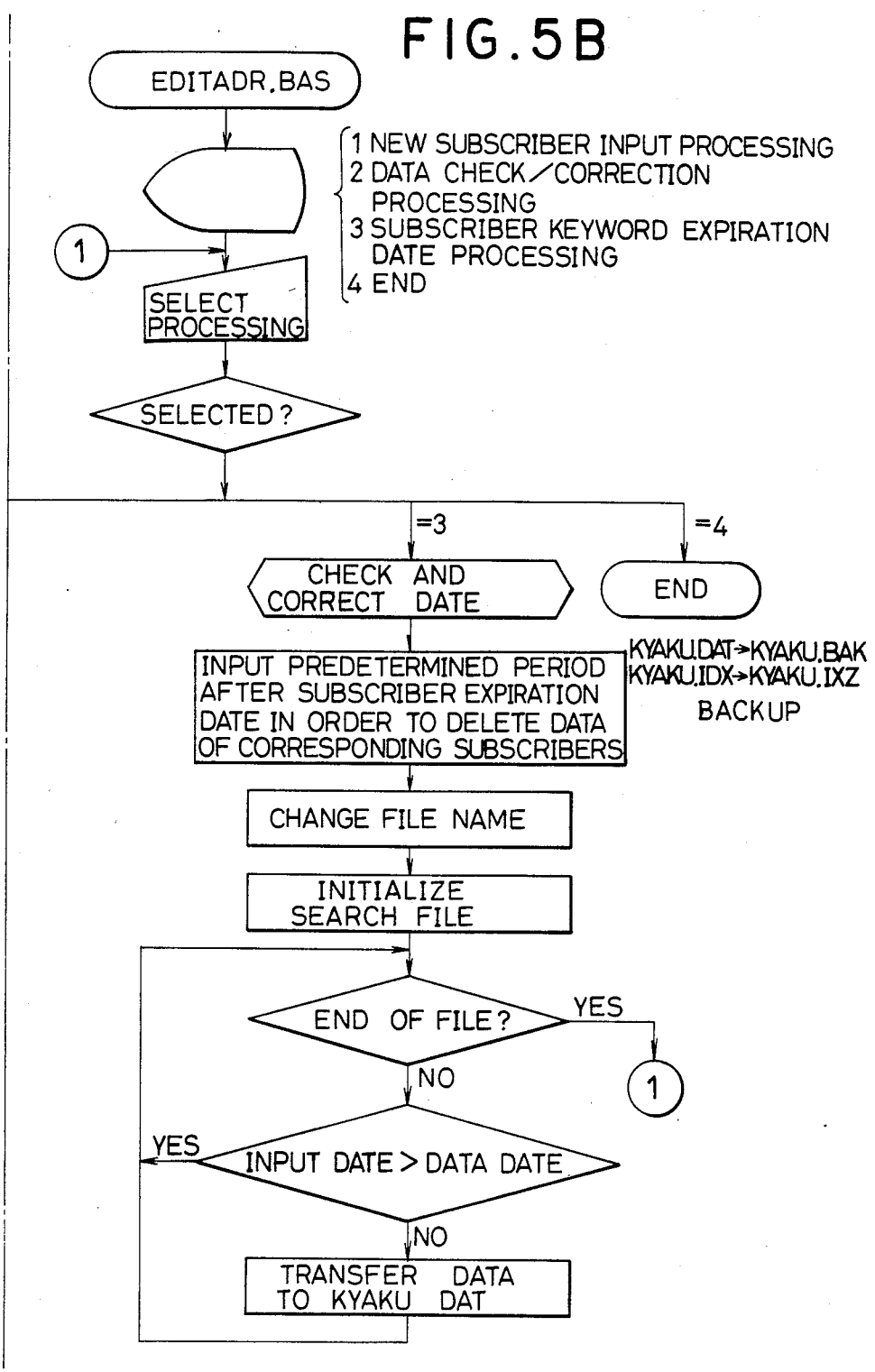

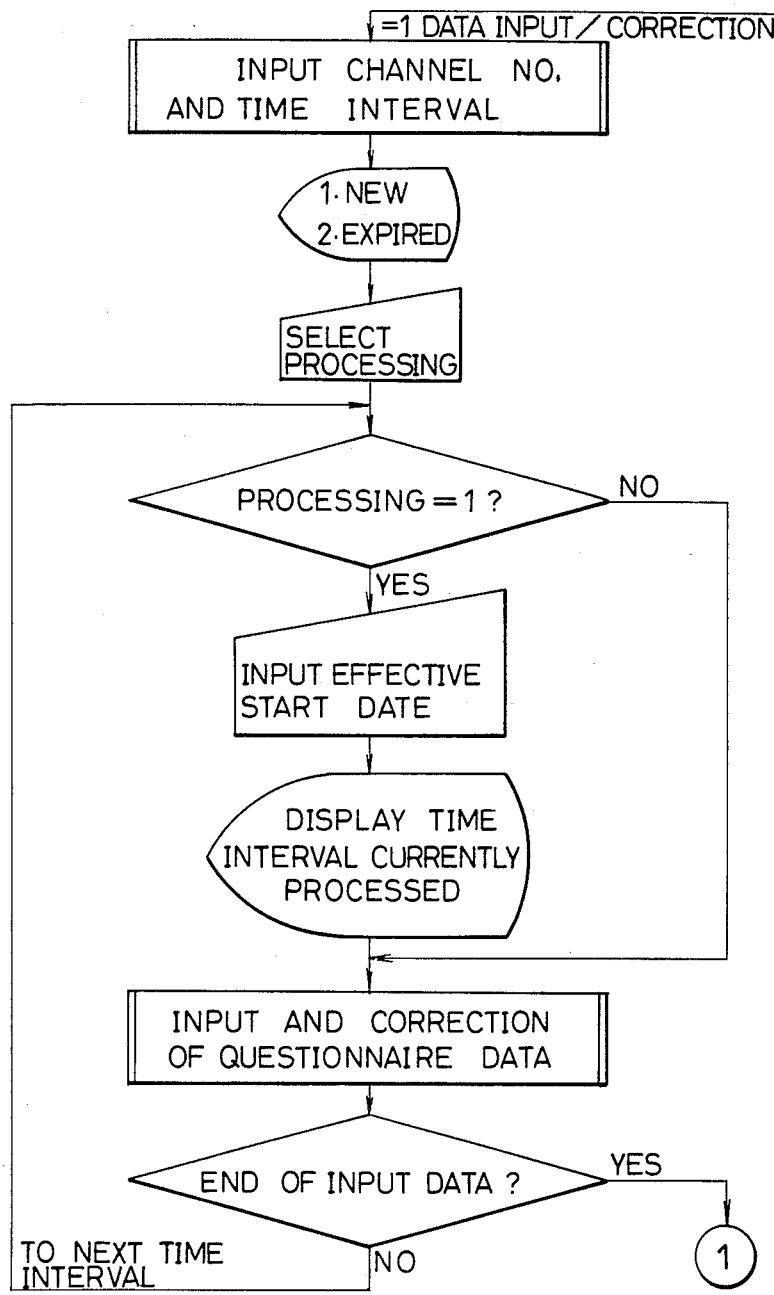

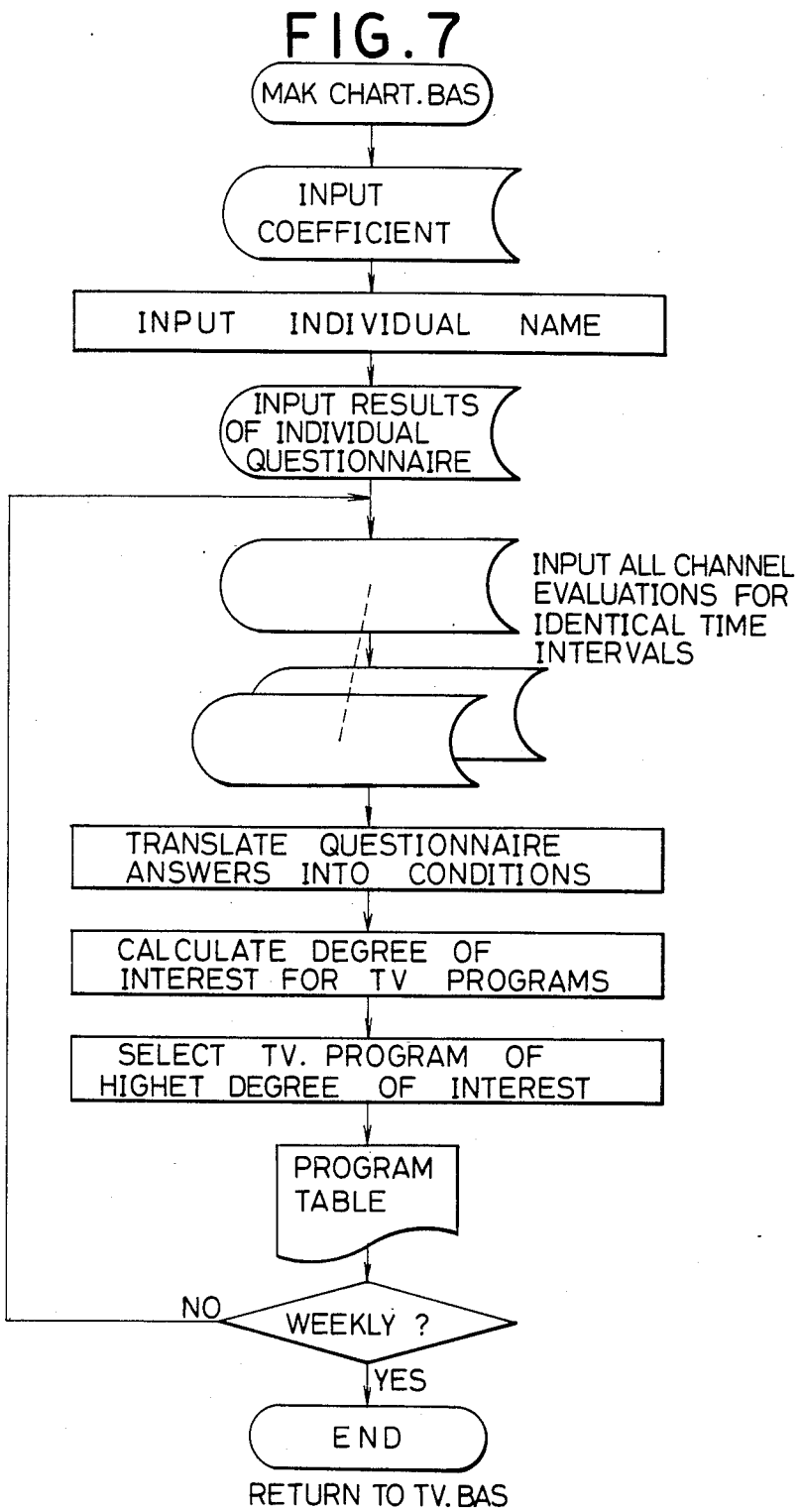

FIG.8

| MORNING | 5 | | | | 6 | | | | 7 | | | | 8 | | | | 9 | | | | 10 | | | | 11 | | | |
|---|---|---|---|---|---|---|---|---|---|---|---|---|---|---|---|---|---|---|---|---|---|---|---|---|---|---|---|---|
| | 00 | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 |
| SUNDAY | - | - | - | - | 1 | 1 | 1 | 1 | 1 | 1 | 1 | 1 | 1 | 1 | 10 | 10 | 6 | 6 | 6 | 6 | 3 | 3 | 3 | 3 | 4 | 4 | 4 | 4 |
| MONDAY | - | - | - | - | 1 | 1 | 1 | 1 | 1 | 1 | 1 | 1 | 1 | 1 | 10 | 10 | 6 | 6 | 6 | 10 | 3 | 3 | 8 | 8 | 4 | 4 | 4 | 4 |
| TUESDAY | - | - | - | - | 1 | 1 | 1 | 1 | 1 | 1 | 1 | 1 | 1 | 1 | 4 | 4 | 10 | 10 | 10 | 10 | 8 | 8 | 8 | 8 | 4 | 4 | 4 | 4 |
| WEDNESDAY | - | - | - | - | 1 | 1 | 1 | 1 | 1 | 1 | 1 | 1 | 4 | 4 | 4 | 4 | 4 | 4 | 4 | 4 | 8 | 8 | 8 | 8 | 4 | 4 | 4 | 4 |
| THURSDAY | - | - | - | - | 1 | 1 | 1 | 1 | 1 | 1 | 1 | 1 | 4 | 4 | 8 | 8 | 6 | 6 | 6 | 6 | 8 | 1 | 1 | 1 | 1 | 10 | 10 | 10 |
| FRIDAY | - | - | - | - | 1 | 1 | 1 | 1 | 1 | 1 | 1 | 1 | 1 | 1 | 1 | 1 | 4 | 4 | 4 | 6 | 4 | 4 | 4 | 4 | 4 | 10 | 10 | 10 |
| SATURDAY | - | - | - | - | 1 | 1 | 1 | 1 | 1 | 1 | 1 | 1 | 1 | 1 | 1 | 1 | 4 | 4 | 4 | 6 | 4 | 4 | 4 | 4 | 4 | 10 | 10 | 10 |

| AFTERNOON | 12 | | | | 1 | | | | 2 | | | | 3 | | | | 4 | | | | 5 | | | | 6 | | | |
|---|---|---|---|---|---|---|---|---|---|---|---|---|---|---|---|---|---|---|---|---|---|---|---|---|---|---|---|---|
| | 00 | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 |
| SUNDAY | 12 | 12 | 12 | 12 | 12 | 12 | 12 | 12 | 1 | 1 | 1 | 1 | 1 | 1 | 10 | 10 | 6 | 6 | 6 | 6 | 3 | 3 | 3 | 3 | 4 | 4 | 4 | 4 |
| MONDAY | 12 | 12 | 12 | 12 | 12 | 12 | 12 | 12 | 1 | 1 | 1 | 1 | 1 | 1 | 10 | 10 | 6 | 6 | 6 | 10 | 3 | 3 | 8 | 8 | 4 | 4 | 4 | 4 |
| TUESDAY | 12 | 12 | 1 | 1 | 1 | 1 | 1 | 1 | 1 | 1 | 1 | 1 | 1 | 1 | 4 | 4 | 10 | 10 | 10 | 10 | 8 | 8 | 8 | 8 | 4 | 4 | 4 | 4 |
| WEDNESDAY | 3 | 3 | 3 | 3 | 1 | 1 | 1 | 1 | 1 | 1 | 1 | 1 | 4 | 4 | 4 | 4 | 4 | 4 | 4 | 4 | 8 | 8 | 8 | 8 | 4 | 4 | 4 | 4 |
| THURSDAY | 6 | 6 | 6 | 6 | 3 | 3 | 3 | 3 | 1 | 1 | 1 | 1 | 4 | 4 | 8 | 8 | 4 | 4 | 4 | 6 | 8 | 1 | 1 | 1 | 1 | 4 | 4 | 4 |
| FRIDAY | 4 | 4 | 4 | 4 | 6 | 6 | 6 | 6 | 1 | 1 | 1 | 1 | 1 | 1 | 8 | 8 | 6 | 6 | 6 | 6 | 4 | 4 | 4 | 4 | 4 | 4 | 4 | 4 |
| SATURDAY | 8 | 8 | 8 | 8 | 4 | 4 | 4 | 4 | 1 | 1 | 1 | 1 | 1 | 1 | 8 | 8 | 6 | 6 | 6 | 6 | 4 | 4 | 4 | 4 | 6 | 6 | 6 | 6 |

| EVENING&NIGHT | 7 | | | | 8 | | | | 9 | | | | 10 | | | | 11 | | | | 12 | | | | 1 | | | | 2 | | | |
|---|---|---|---|---|---|---|---|---|---|---|---|---|---|---|---|---|---|---|---|---|---|---|---|---|---|---|---|---|---|---|---|---|
| | 00 | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 |
| SUNDAY | 4 | 4 | 4 | 4 | 3 | 3 | 3 | 3 | 6 | 6 | 1 | 1 | 1 | 1 | 1 | 1 | 1 | 1 | 4 | 4 | 6 | 6 | 6 | 6 | 3 | 3 | 3 | 3 | - | - | - | - |
| MONDAY | 4 | 4 | 4 | 4 | 3 | 3 | 3 | 3 | 6 | 6 | 1 | 1 | 1 | 1 | 1 | 1 | 1 | 1 | 4 | 4 | 6 | 6 | 6 | 10 | 3 | 3 | 8 | 8 | - | - | - | - |
| TUESDAY | 3 | 3 | 1 | 1 | 12 | 12 | 12 | 12 | 1 | 1 | 1 | 1 | 1 | 1 | 1 | 1 | 1 | 1 | 4 | 4 | 10 | 10 | 10 | 10 | 8 | 8 | 8 | 8 | - | - | - | - |
| WEDNESDAY | 3 | 3 | 1 | 1 | 12 | 12 | 12 | 12 | 1 | 1 | 1 | 1 | 1 | 1 | 1 | 1 | 8 | 8 | 8 | 8 | 4 | 4 | 10 | 10 | 4 | 4 | 1 | 1 | - | - | - | - |
| THURSDAY | 10 | 10 | 10 | 10 | 6 | 6 | 6 | 6 | 4 | 4 | 4 | 4 | 1 | 1 | 1 | 1 | 8 | 8 | 8 | 8 | 4 | 4 | 10 | 10 | 8 | 8 | 1 | 1 | - | - | - | - |
| FRIDAY | 10 | 10 | 10 | 0 | 6 | 6 | 6 | 6 | 4 | 4 | 4 | 4 | 1 | 1 | 1 | 1 | 8 | 8 | 8 | 8 | 4 | 4 | 4 | 4 | 1 | 1 | 1 | 1 | - | - | - | - |
| SATURDAY | 12 | 12 | 12 | 12 | 6 | 6 | 6 | 6 | 4 | 4 | 4 | 4 | 1 | 1 | 1 | 1 | 8 | 8 | 8 | 8 | 6 | 6 | 6 | 6 | 4 | 4 | 4 | 4 | - | - | - | - |

| FIG.9A | FIG.9B |

1. COMPLAINT RECEPTION PROCESSING
2. COMPLAINT PROCESSING / END
3. COMPLAINT PENDING / END

GET CLAIM BAS

↓

INPUT PROCESSING ← (1)

↓

PROCESSING NUMBER?

=1 ↓

INPUT KEYWORD OF SUBSCRIBER WITH COMPLAINT

↓

SEARCH RECORD

↓

RECORD EXISTS? —YES→ CORRECTION INPUT → UPDATE VALUES TO BE CORRECTED

↓ NO

NEW SUBSCRIBER?

↓

YES (1)

↓ YES

INPUT ITEMS EXCLUDING KEYWORD

↓

NEW REGISTRATION

↓

INPUT OTHER INFORMATION CONCERNING COMPLAINT

↓

OUTPUT COMPLAINT CONTENTS

↓

(1)

METHOD OF AND APPARATUS FOR OPTIMAL SCHEDULING OF TELEVISION PROGRAMMING TO MAXIMIZE CUSTOMER SATISFACTION

BACKGROUND OF THE INVENTION

1. Field of the Invention

The present invention relates to editing of an individual television program according to linear programming, a method of automatically controlling a program rating, and an apparatus therefor.

2. Description of the Prior Art

In order to implement such an apparatus according to conventional techniques, a program editor selects suitable programs reflecting a customer's taste from among all available television programs by utilizing subjective knowledge according to the results of questionnaires filled by end users (customers). In this case, the programs are selected on at least a once-per-week basis. The programs are listed and printed out in a tape-like table (to be referred to as a table hereinafter) according to the channel numbers and time intervals. The TV or VTR is then automatically set according to this table. Japanese Patent Publication Nos. 41-8542, 42-1882, 53-40340, and 59-21114 issued to the present applicant are concerned with the above conventional system.

SUMMARY OF THE INVENTION

It is an object of the present invention to edit an individual television program list which is formed on the basis of objective decision and which satisfies a customer.

It is another object of the present invention to provide a method and apparatus for editing individual television program lists in a short period of time, even if many customers simultaneously order the lists.

It is still another object of the present invention to eliminate subjective opinions of an editor when he selects programs suitable for the tastes of customers from among all available television programs.

It is still another object of the present invention to provide a method employing linear programming for questionnaires and program evaluation and adopting a technique for feeding back complaints against the evaluation results, thereby improving satisfaction of the customers in the individual television programs listed by the editor.

It is still another object of the present invention to edit a control tape for controlling an automatic controller incorporated in a TV or VTR according to the program list.

In order to achieve the above objects of the present invention, the present invention is constituted by a method comprising the steps of: statistically processing objective data according to linear programming; inputting processed results in a computer, storing them on a hard disk, and printing out the contents therein; and periodically feeding back complaints to be compared against the processing results to improve reliability of the data. The preferred embodiment also includes editing of a control tape. The functional system diagram is shown in FIG. 2.

BRIEF DESCRIPTION OF THE DRAWINGS

FIGS. 5A and 5B are a flow chart for processing questionnaire information (subscriber data registration);
FIG. 7 is a flow chart for editing television programs according to linear programming;
FIG. 8 is a table showing an output of a television program table;
FIGS. 9A and 9B are a flow chart for processing a complaint.

DETAILED DESCRIPTION OF THE PREFERRED EMBODIMENT

The present invention is constituted by a means for evaluating questionnaires collected from end users, a means for evaluating all available television programs, a means for calculating the evaluation results according to linear programming and editing data (a television program list for time intervals and channel numbers in a form suitable for each customer), a means for inputting the data in a computer and causing the computer to calculate the data, a means for temporarily storing an output from the computer, a means for printing out each individual television program list (to be referred to as a program list hereinafter) according to the storage contents, a means for feeding back complains against the first printed-out program list, and a means for automatically controlling a TV or VTR according to the program list. The constitution of the present invention described above is expressed as a program diagram in FIG. 3.

Although hardware associated with the above operations is added to constitute the entire system, a control tape is finally edited to control an automatic controller incorporated in a TV or VTR. This is known in conventional systems to those skilled in the art, and since it is not directly associated with the present invention, a detailed description thereof will be omitted. The structures and operations of the means described above will be described below:

(1) Subscriber Questionnaire Result Input Means

Figure 1:
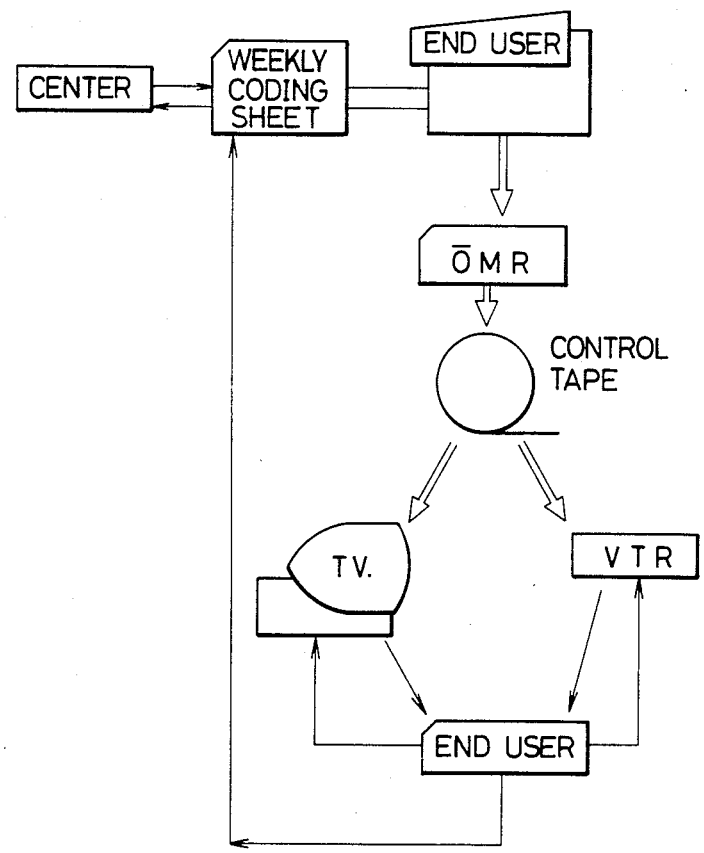
FIG. 1 is a block diagram of a conventional system.
Figure 2:
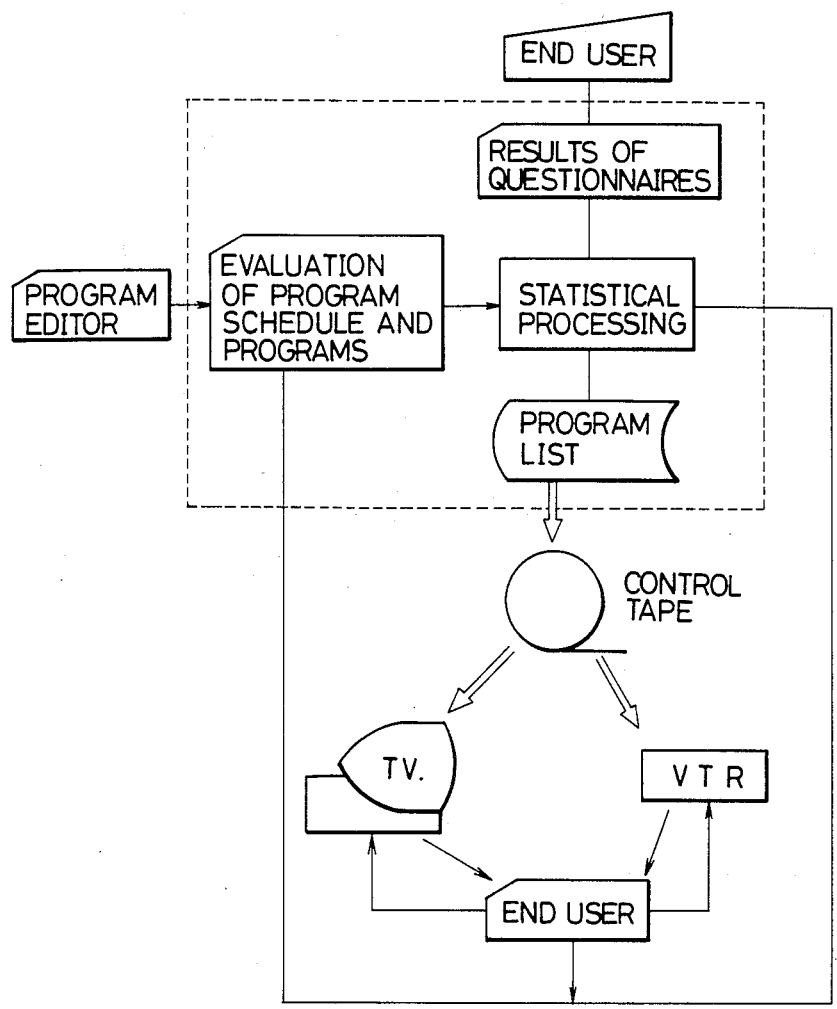
FIG. 2 is a block diagram of a system according to the present invention.
Figures 3, 4:
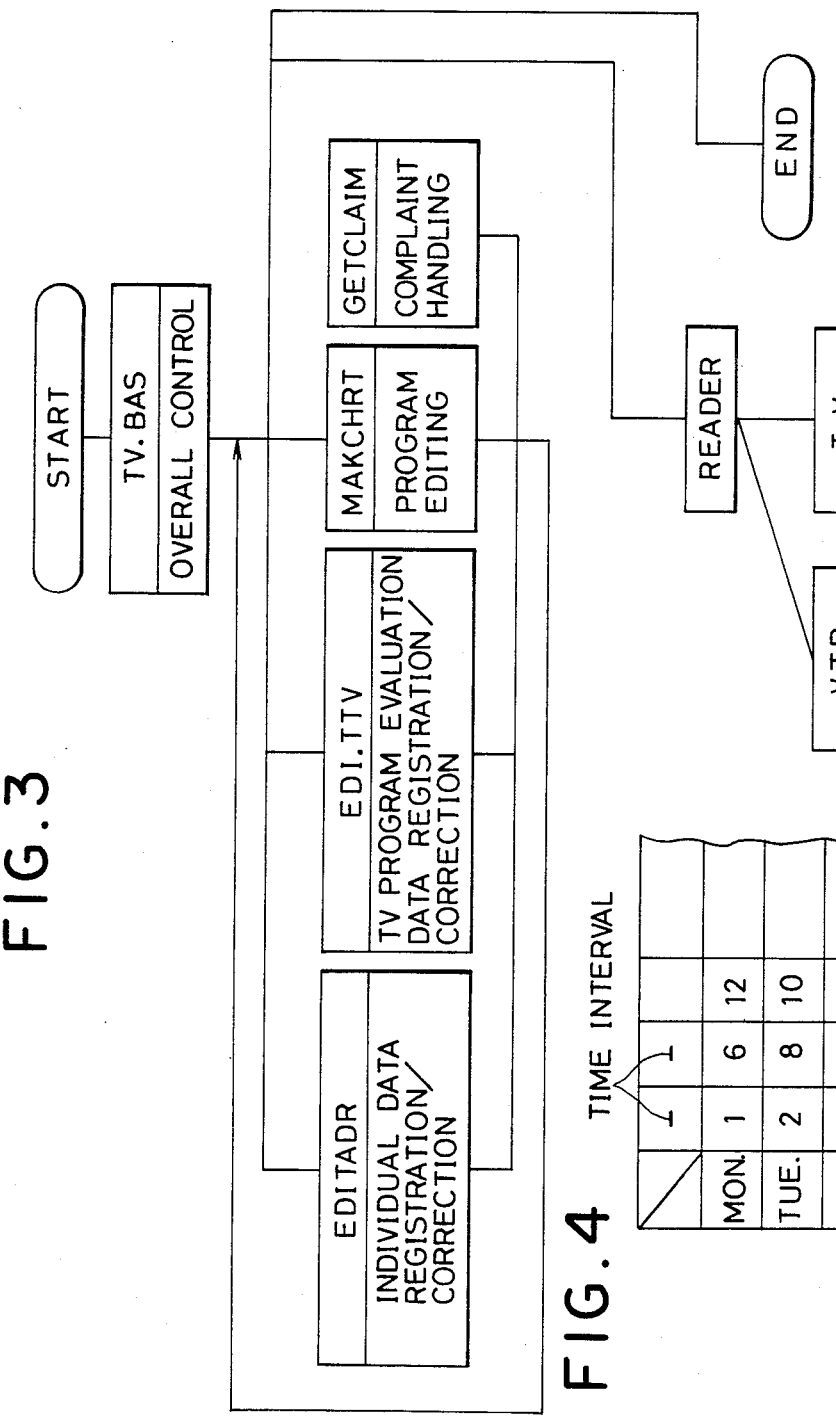
FIG. 3 is a diagram showing a computer program according to the present invention.
FIG. 4 is a table showing the relationship between time intervals, days, and television channel numbers according to the results of questionnaires.

FIG. 4 shows one form of questionnaire used as a questionnaire result input means for extracting and representing individual tastes. Referring to FIG. 1, the leftmost column represents days of the week, and the uppermost row represents time intervals (in units of 15 minutes). Television channel Nos. are respectively filled at intersections of corresponding rows and columns. A basic questionnaire for editing the list described above is exemplified below:

| Subscriber Questionnaire |
| --- |
| Q1: Are you married or single? |
| 1. Single |
| 2. Married without children |
| 3. Married with children in the age group of 0 to 6 years old |
| 4. Married with children in the age group of 7 to 12 2 years old |
| 5. Married with children in the age group of 13 years old or more |

Subscriber Questionnaire -continued

Q2: What is your age group?
- 6. 25 years old or less
- 7. 35 years old or less
- 8. 45 years old or less
- 9. 55 years old or less
- 10. 56 years old or more Q3: Do you Watch NHK (Nihon Hoso Kyokai) programs?
- 11. Never
- 12. Only news or morning programs
- 13. Only educational programs
- 14. The same amount as commercial television programs
- 15. Usually Q4: Do you watch political and economic programs?
- 16. Always
- 17. Usually
- 18. Often
- 19. Sometimes
- 20. Never Q5: Do you watch science programs?
- 21. Always
- 22. Usually
- 23. Often
- 24. Sometimes
- 25. Never Q6: Do you watch historical programs?
- 26. Always
- 27. Usually
- 28. Often
- 29. Sometimes
- 30. Never Q7: Do you watch documentary programs?
- 31. Always
- 32. Usually
- 33. Often
- 34. Sometimes
- 35. Never Q8: Do you watch news programs?
- 36. Always
- 37. At least once a day
- 38. Not if a desired program is in the same time interval
- 39. Sometimes
- 40. Never Q9: Do you like performing arts programs?
- 41. Like very much
- 42. Like somewhat
- 43. Indifferent
- 44. Dislike somewhat
- 45. Dislike very much Q10: Do you like sports programs?
- 46. Like very much
- 47. Like somewhat
- 48. Indifferent
- 49. Dislike somewhat
- 50. Dislike very much Q11: Do you like "variety talk show" programs?
- 51. Like very much
- 52. Like somewhat
- 53. Indifferent
- 54. Dislike somewhat
- 55. Dislike very much Q12: Do you like quiz show programs?
- 56. Like very much
- 57. Like somewhat
- 58. Indifferent
- 59. Dislike somewhat
- 60. Dislike very much Q13: Do you like variety show programs?
- 61. Like very much
- 62. Like somewhat
- 63. Indifferent
- 64. Dislike somewhat
- 65. Dislike very much Q14: Do you like "rock'n' roll" and "foreign pops" musical programs?
- 66. Like very much
- 67. Like somewhat
- 68 Indifferent
- 69. Dslike somewhat
- 70. Dislike very much Q15: Do you like "folk song" and "contemporary singer/song writers or equivalent" musical programs?
- 71. Like very much
- 72. Like somewhat
- 73. Indifferent
- 74. Dislike somewhat
- 75. Dislike very much Q16: Do you like "classical" musical programs?
- 76. Like very much
- 77. Like somewhat
- 78. Indifferent
- 79. Dislike somewhat
- 80. Dislike very much Q17: Do you like Samurai programs?
- 81. Like very much
- 82. Like somewhat
- 83. Indifferent
- 84. Dislike somewhat
- 85. Dislike very much Q18: Do you like "home drama" and comedy programs?
- 86 Like very much
- 87. Like somewhat
- 88. Indifferent
- 89. Dislike somewhat
- 90. Dislike very much Q19: Do you like suspense and action dramas?
- 91. Like very much
- 92. Like somewhat
- 93. Indifferent
- 94. Dislike somewhat
- 95. Dislike very much Q20: Do you like foreign movies in Japan?
- 96. Like very much
- 97. Like somewhat
- 98. Indifferent
- 99. Dislike somewhat
- 100. Dislike very much In the above questionnaire, five selection items are provided for each of 20 questions, so that a total of $20 \times 5 = 100$ items are provided. The 20 questions include questions on family members, age groups, time intervals in which customers do not watch television, and favorite dramas, as well as questions for determining whether the customers prefer NHK programs and news programs, and which program is the most interesting. Each question has five possible selection items. The items for linear programming (to be described later) are assigned with numbers as follows. The first question is assigned with $P(1)$ to $P(5)$; the second question with $P(6)$ to $P(10)$; the third question with $P(11)$ to $P(15)$; ...; and the twentieth question with $P(96)$ to $P(100)$. The flow chart of the subscriber data registration/retrieval (correction) is shown in FIG. 5.

(2) TV Program Evaluation Means

A TV program evaluation means has the same form as that of the questionnaire described in (1) Subscriber Questionnaire Result Input Means, and is associated with the contents of questions asked of the subscribers for respective TV programs.

TV Program Evaluation

E1: Target age group of the TV program
- 1. Children of 6 years old or less
- 2. Children of 7 to 12 years old
- 3. Young people
- 4. Middle-aged people
- 5. The Elderly E2: Political and economic factor
- 1. Strong
- 2. Moderate
- 3. Slight
- 4. Very slight

TV Program Evaluation (continued)

5. None
E3: Scientific factor
1. Strong
2. Moderate
3. Slight
4. Very slight
5. None
E4: Historical and educational factor
1. Strong
2. Moderate
3. Slight
4. Very slight
5. None
E5: Documentary factor
1. Strong
2. Moderate
3. Slight
4. Very slight
5. None
E6: Factor of news or other information source
1. Strong
2. Moderate
3. Slight
4. Very slight
5. None
E7: Factor of show business and gossip
1. Strong
2. Moderate
3. Slight
4. Very slight
5. None
E8: Factor of sports program
1. Strong
2. Moderate
3. Slight
4. Very slight
5. None
E9: Factor of variety talk show
1. Strong
2. Moderate
3. Slight
4. Very slight
5. None
E10: Factor of quiz show program
1. Strong
2. Moderate
3. Slight
4. Very slight
5. None
E11: Factor of variety show
1. Strong
2. Moderate
3. Slight
4. Very slight
5. None
E12: Factor of rock'n' roll and pops program
1. Strong
2. Moderate
3. Slight
4. Very slight
5. None
E13: Factor of Japanese pops program
1. Strong
2. Moderate
3. Slight
4. Very slight
5. None
E14: Factor of classical music program
1. Strong
2. Moderate
3. Slight
4. Very slight
5. None
E15: Factor of Samurai program
1. Strong
2. Moderate
3. Slight
4. Very slight
5. None
E16: Factor of home drama and comedy program
1. Strong

TV Program Evaluation (continued)

Figure 6B:
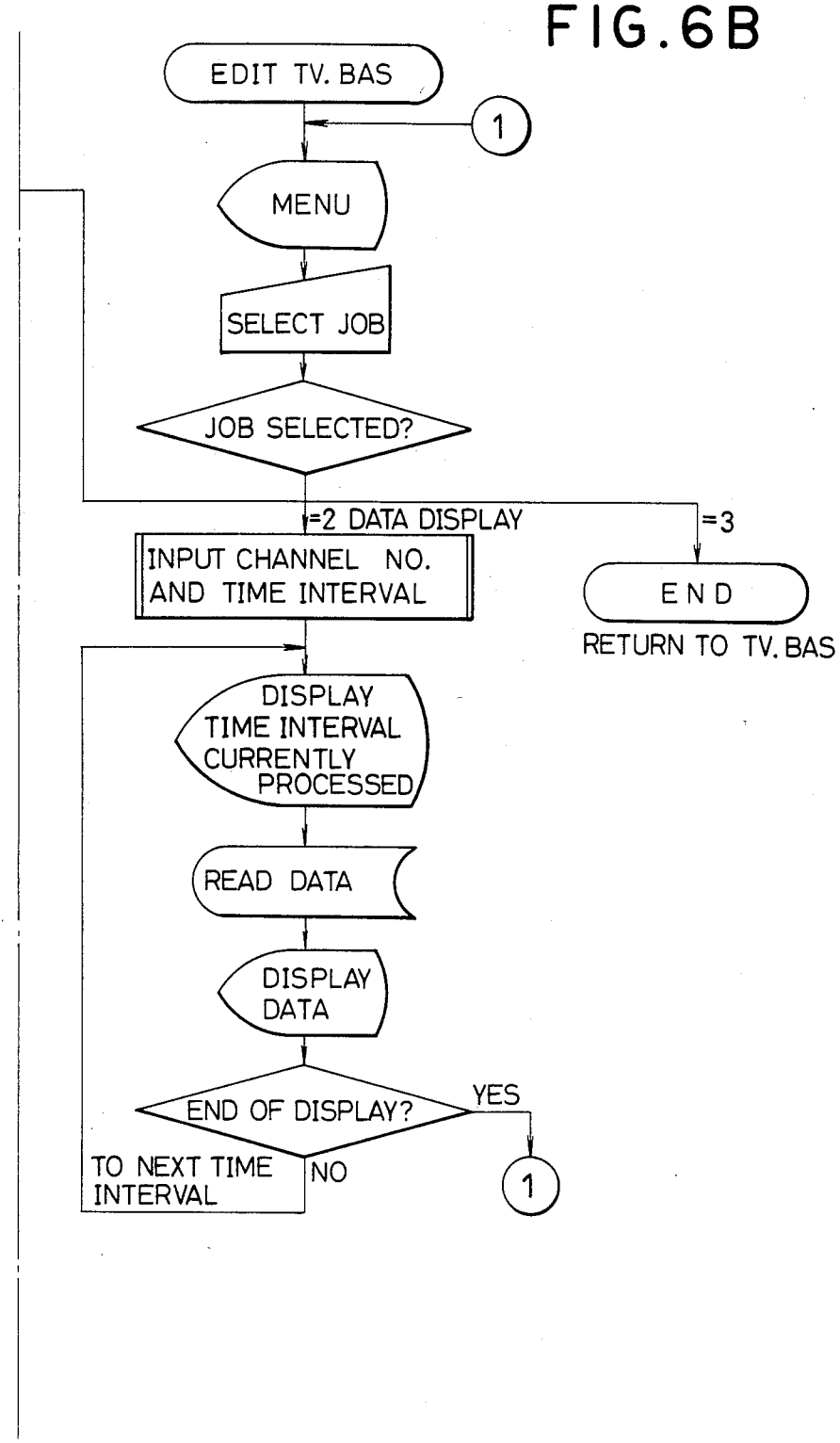
FIG. 6 is a flow chart of television program evaluations.

2. Moderate
3. Slight
4. Very slight
5. None
E17: Factor of suspense and action drama
1. Strong
2. Moderate
3. Slight
4. Very slight
5. None
E18: Factor of foreign movie in Japan
1. Strong
2. Moderate
3. Slight
4. Very slight
5. None The data registration for TV programs is given in the flow chart of FIG. 6.

(3) Linear Programming Means

The basic algorithm for linear-programming the evaluations in the above (1) and (2) will be described. The system of the present invention is based on the following algorithm:

$$Pl(i) = \sum_{j=1}^{n} Pc(j) \cdot P(j) \cdot T(i,j) \tag{1}$$

where
Pl(i): the degree of interest of one subscriber for the ith program (the degree is represented by a numeral; the degree given by numeral "0" represents no interest).
i: the ith program when the 21 hours from 5 a.m. to 2 a.m. are divided into 15-minute intervals.
P(j): representing that the subscriber circles the jth items in the questionnaire. If the subscriber circles item 3 in question 3, P(11)=P(12)=P(14)=P(15)=0 and P(13)=1.
n: 20 questions×5 selection items=100
T(i,j): representing that the jth item of the ith TV program is circled. i and j are given by 1 or 0.
Pc(j): an unknown coefficient for 0≦Pc(j) (having nothing to do with the subscribers)

Equation (1) is a mathematical expression for evaluating a degree of commonness between the subscriber preferences and the TV programs. Coefficient Pc(j) is commonly given for all subscribers. The value of Pc(j) is accurately determined by the feedback of complaints from the subscribers.

In order to evaluate commonness between the subscriber preferences and the TV programs, linear programming is represented by an equation of the first degree. The coefficient Pc(j) is a common value for all subscribers. The value of Pc(j) is accurately calculated by feeding back (i.e., learning) complaints from the subscribers, and a detail description thereof will be made later.

(4) Data Storage Means and Printout Means

A data storage means according to the present invention is exemplified by a hard disk. Data input to the hard disk is immediately printed out, as shown in the flow chart of FIG. 7. If data for several thousands of subscribers is stored in the hard disk and code numbers are respectively assigned to the individual subscribers, an optical program table for each subscriber can be printed out, as shown in FIG. 8. According to a test, it took about 20 minutes to print out each program table after evaluation of the questionnaire if program language FORTRAN was used. The term "print out" does not mean that the program table is finally presented to the corresponding subscriber but that the table is confirmed in processing. The printed program table must be tested. By collecting complaints and feeding them back, a more complete program table can be prepared.

(5) Complaint Processing

As described last in the basic algorithm for the above data processing, the value of Pc(j) is accurately calculated by collecting complaints from the subscribers. An example of complaint reception is given as follows:

Calculation results are given for a given subscriber:

$Pl(Tue/19:30)TBS = 4.9$ (the degree of interest)

$Pl(Tue/19:30)NHK = 4.8$ (the degree of interest)

where TBS and NHK are Japanese TV broadcasting stations. A proposal for programming station TBS for Tuesday 19:30 is made. Assume that the given subscriber presents a complaint to this proposal in the following manner.

"$Pl(i1) \geq Pl(i2)$" is not acceptable and

"$Pl(i1) < Pl(i2)$" is desired

In this case, a difference between the degree of interest for Pl(i2) and that for Pl(i1) is represented by Yi. In other words, this is associated with an evaluation of the degree of importance of the complaint. At present, $Yi = -1$. In this case, $Pl(i2) - \{Pl(i1) + Yi\} \leq 0$ Substitution of equation (1) into the above inequality yields the following inequality:

$$\sum_{j=1}^{n} Pc(j) \cdot P(j) \cdot \{T(i1,j) - T(i2,j)\} - Yi \leq 0$$

Assuming that $P(j) \cdot \{T(i1,j) - T(i2,j)\} = Aij$ and $Pc(j) = Xj$ the above inequality can be rewritten as:

$$\sum_{j=1}^{n} Aij \cdot Xj - Yi \leq 0$$

The left-hand side is then substituted by Vi, so that:

$$Vi = \sum_{j=1}^{n} Aij \cdot Xj - Yi$$

Xj is determined to minimize Vi. Assuming only a sum V of positive values Vi (programs causing complaints), $$V = \sum_{k}^{m} Vi \text{ for } Vi > 0$$

where m is the total number of Vi components for Vi>0, as many as complaints possible must be received. A minimum V is then calculated to determine the accurate Xj. The above operation is given by the flow chart in FIG. 9.

Figure 9B:
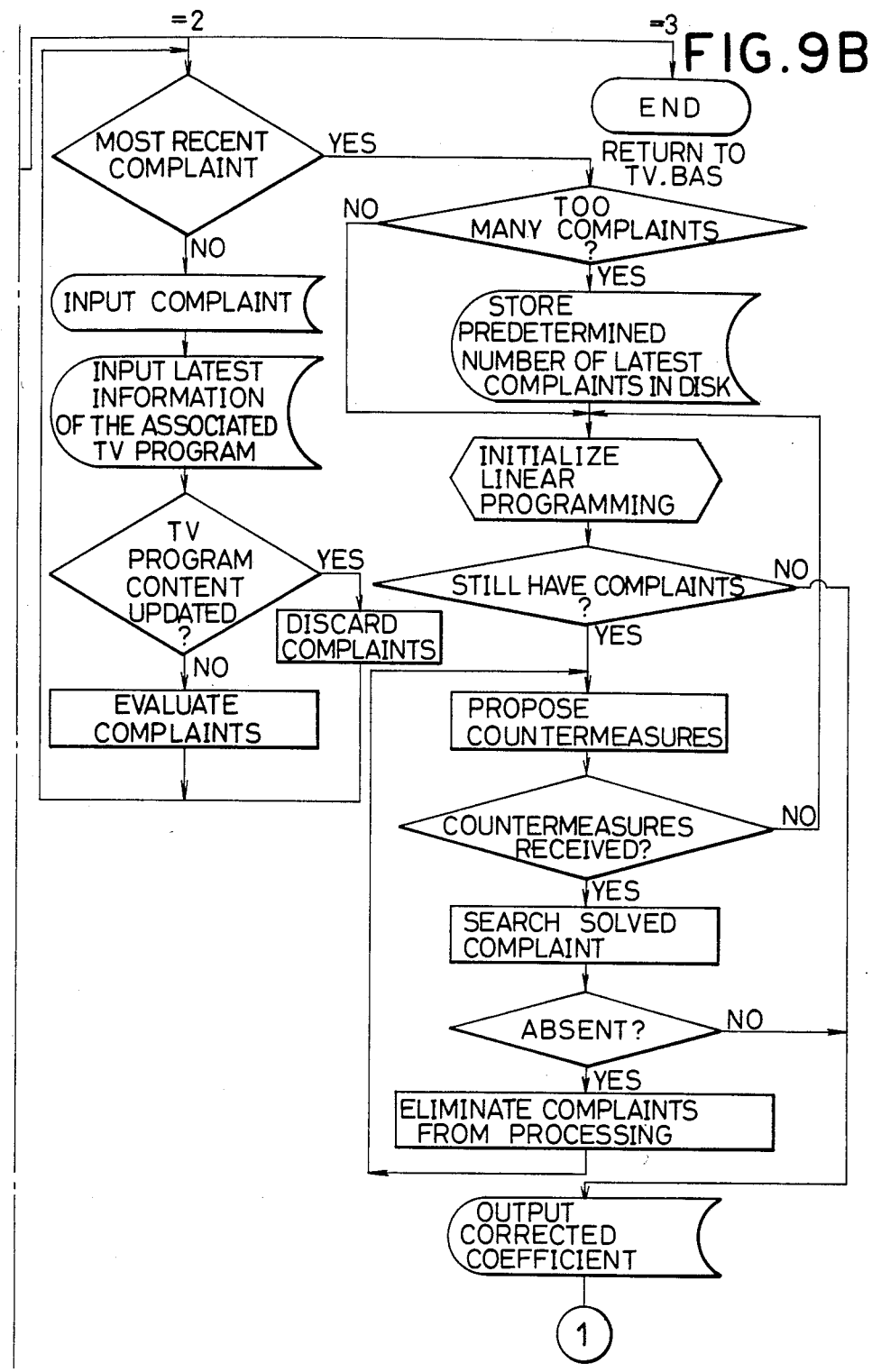

Referring to FIG. 9, "Search Record" in Processing=1 means search of data for one subscriber. "Input Items Excluding Keyword" indicates the selection items excluding the subscriber name read in katakana characters and the date of birth. "New Input" indicates a new subscriber to be registered. However, if the corresponding record is found, i.e., YES, the correct input is entered to update the corresponding value. The flow then advances by selecting an alternative step. In short, in complaint processing, a series of steps from "Initialize Linear Programming" to "Find Countermeasures" are important in Processing=2. More specifically, linear programming initialization is a recalculation of Pc(j). The countermeasures indicate that a Pc(j) value different from the current value is calculated and updates the current value. These mathematical steps are the center of complaint processing, i.e., the learning function. The coefficient Pc(j) can be more accurate to improve prediction precision. Therefore, more suitable programs can be provided to the subscribers.

Figure 10:
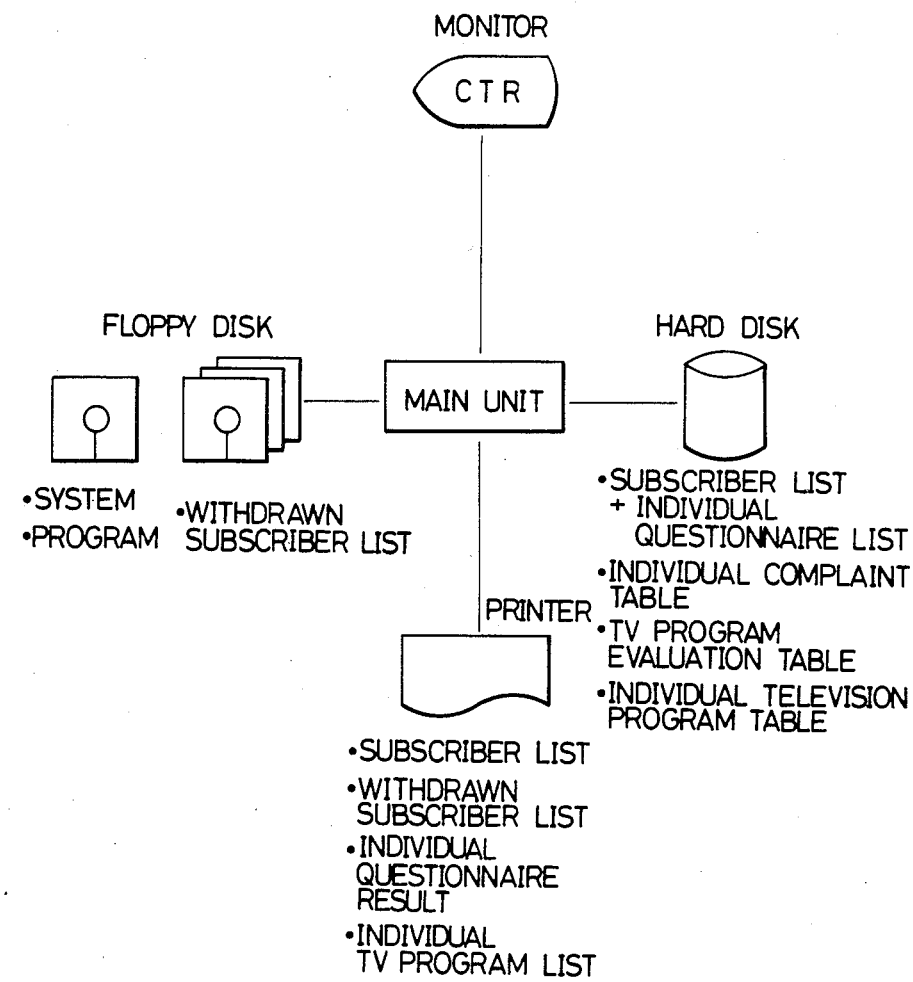
FIG. 10 is a diagram of components associated with a computer according to the present invention.

The overall system is shown in FIG. 10; identification of components is in Appendix I. The steps in the program can be represented by Appendix II.

The embodiment described above exemplifies TV program ratings. However, the method and apparatus of the present invention is not limited to such a particular application. Evaluations can be made according to questionnaires similar to that in the above embodiment. The results are linear-programmed to collect the individual complaints and then to feed them back for processing, thereby further improving prediction precision. In this manner, the present invention can also be applied to surveys other than the embodiment described in this specification.

(1) MONITOR (2) FLOPPY DISK (3) SYSTEM PROGRAM (4) WITHDRAWN SUBSCRIBER LIST (5) PRINTER (6) SUBSCRIBER LIST (7) WITHDRAWN SUBSCRIBER LIST (8) INDIVIDUAL QUESTIONNAIRE RESULT (9) INDIVIDUAL TV PROGRAM LIST

(10) HARD DISK

(11) SUBSCRIBER LIST + INDIVIDUAL QUESTIONNAIRE LIST

(12) INDIVIDUAL COMPLAINT TABLE

(13) TV PROGRAM EVALUATION TABLE

(14) INDIVIDUAL TELEVISION PROGRAM TABLE

(15) MAIN UNIT

```
1 '*********************************************************
2 '*        PROGRM    --- EDITTV.BAS                        *
3 '*        FUNCTION  --- MAIN                              *
4 '*-------------------------------------------------------*
5 '*                              1985/3/12                 *
6 '*                              SINWA SYSTEM PRODUCTS     *
7 '*********************************************************
110 REM CHECK IF THE PRINTER IS PROPERLY CONNECTED
120 COLOR 4
130 IF (INP(&H62) AND 76)=72 THEN 200
140 PRINT "PREPARE THE PRINTER"
150 PRINT "IF PREPARED, PRESS RETURN"
160 PRINT "IF NOT PREPARED, PRESS ANOTHER KEY"
170 BEEP
180 IF INPUT$(1)<>CHR$(13) THEN RUM "TV.BAS"
190 GOTO 100
200 COLOR 7
210 DEFINT A-Z
220 GOSUB 1940
230 REM OPEN FILE
240 LET TIMELIMIT=4*24*7
250 REM TIMELIMIT IS NUMBER OF 15-MIN INTERVALS PER WEEK
260 REM CHANTABLE INITIALIZATION
270 LET MAXCHANNEL=12
280 REM MAXCHANNEL IS MAXIMUM CHANNEL NUMBER
290 DIM CHANTABLE(MAXCHANNEL)
300 REM CONVERT ACTUAL CHANNEL NO. TO NO. OBTAINED BY NO. OF
CHANNELS FROM 0 MINUS 1.
310 REM SET ACTUAL CHANNEL NO. LIST IN DATA STATEMENT. 0 IS
END MARK.
320 DATA 1,3,4,6,8,10,12,0
330 FOR I=1 TO MAXCHANNEL
340 REM CHANTABLE INITIALIZATION
350 LET CHANTABLE(I)=-1
360 REM -1 IS MARK FOR NON-EXISTING CHANNEL
370 NEXT I
380 REM STATION IS INTERNAL PROGRAM NO. ASSIGNED TO CHANNEL
390 LET STATION=0
400 READ CHANNEL
410 IF CHANNEL=0 THEN 450
420 LET CHANTABLE(CHANNEL)=STATION
430 LET STATION=STATION+1
440 GOTO 400
450 REM COLOR INITIALIZATION
460 LET WHITE=7
470 LET RED=4
480 LET YELLOW=6
490 LET GREEN=2
500 LET SKY=3
510 LET PURPLE=5
520 FIELD #1,32 AS ONEPROGRAM$
530 REM ONEPROGRAM$ IS ONE RECORD
540 FIELD #1,20 AS SURVEY$, 6 AS VALIDDATE$
```

```
550 REM SURVEY$ IS ITEM IN BUFFER FOR STORING QUESTIONNAIRE
560 IF LOF(1)>0 THEN 640
570 REM FILE IS USED FOR THE FIRST TIME
580 PRINT "PLEASE WAIT"
590 LSET ONEPROGRAM$=STRING$(LEN(ONEPROGRAM$),"0")
600 FOR I=1 to TIMELIMIT*STATION
610 PUT #1,I
620 REM STATION CHANNEL IS ESTIMATED TO PREPARE FILE
630 NEXT I
640 DATA SUN,MON,TUE,WED,THU,FRI,SAT
650 REM DAY ARRAY DAY$ INITIALIZATION
660 DIM DAY$(7)
670 FOR I=1 to 7
680 READ DAY$(I)
690 NEXT I
700 DEF FNPIC99$(X$)=RIGHT$("00"+X$,2)
710 REM FUNCTION FOR CONVERTING X$ TO COBOL PICTURE 99
720 REM JOB SELECTION      * * * * *
730 CLS 1
740 REM SCREEN DELETE
750 COLOR PURPLE
760 PRINT
770 PRINT "TV PROGRAM DATA EDITING PROGRAM"
780 PRINT
790 COLOR SKY
800 PRINT "1.   DATA INPUT/CORRECTION"
810 PRINT "2.   DATA DISPLAY"
820 PRINT "3.   END"
830 COLOR YELLOW
840 PRINT
850 INPUT "WHAT NO.";GYOOMU$
860 CLS 1
870 ON GYOOMU GOSUB 890,1210,1460
880 GOTO 720
890 REM DATA INPUT/CORRECTION SUBROUTINE * * * *
900 REM CHANNEL NO. AND TIME INTERVAL DETERMINATION
910 GOSUB 1670
920 LET NOW=START
930 COLOR YELLOW
940 PRINT
950 PRINT "1.   NEW INPUT/TV PROGRAM CONTENT UPDATING"
960 PRINT "2.   WRONG QUESTIONNAIRE DATA CORRECTION (ACTUAL
TV PROGRAM CONTENTS ARE KEPT UNCHANGED)".
970 PRINT
980 INPUT "WHAT NO.";IFDATE
990 ON IFDATE GOTO 1040,1120
1000 REM WRONG INPUT
1010 BEEP
1020 COLOR RED
1030 GOTO 940
1040 COLOR YELLOW
1050 PRINT
1060 PRINT "WHAT IS VALID DATE FOR NEXT PROGRAM DATA?"
```

```
1070 LINE INPUT "YEAR (LOWER TWO DIGITS IN A.D.)? "; YEAR$
1080 LINE INPUT "MONTH? ";MONTH$
1090 LINE INPUT "DAY? ";DAY$
1100 LET TODAY$=FNPIC99$(YEAR$)+FNPIC99$(MONTH$)+FNPIC99$(DAY$)
1110 REM TODAY$ IS THE DATE
1120 REM NOW TIME INTERVAL INPUT. "NOW" MEANS INTERVAL INPUT SUBROUTINE
1130 GOSUB 2040
1140 REM INPUT AFTER TIME INTERVAL IS DISPLAYED
1150 GOSUB 2120
1160 REM STOP INPUT BY BLANK INPUT OR END OF INTERVAL
1170 IF NOW=FINISH OR INSURVEY$="" THEN RETURN
1180 REM SHIFTING TO NEXT 15-MIN INTERVAL
1190 GOSUB 1980
1200 GOTO 1120
1210 REM DATA DISPLAY SUBROUTINE     * * * * *
1220 REM CHANNEL NO. AND TIME INTERVAL DETERMINATION
1230 GOSUB 1670
1240 LET NOW=START
1250 COLOR GREEN
1260 PRINT "QUESTIONNAIRE ANSWER", "VALID START DATE"
1270 PRINT
1280 REM (NOW)TH TIME INTERVAL DISPLAY
1290 GOSUB 2040
1300 REM RECORD INPUT
1310 GOSUB 1850
1320 COLOR WHITE
1330 REM CONTENT DISPLAY
1340 PRINT ,SURVEY$,"";LEFT$(VALIDDATE$,2);"/";
MID$(VALIDDATE$,3,2);"/";RIGHT$(VALIDDATE$,2)
1350 REM JUMP IF ENDED
1360 IF NOW=FINISH THEN 1400
1370 REM SHIFTING TO NEXT TIME INTERVAL
1380 GOSUB 1980
1390 GOTO 1280
1400 REM END.  ARE OTHERS ALSO DISPLAYED?
1410 COLOR YELLOW
1420 PRINT
1430 INPUT "CONTINUOUSLY DISPLAYED (Y/N)";KOTAE$
1440 IF KOTAE$="Y" or KOTAE$="y" THEN 1210
1450 RETURN
1460 REM END SUBROUTINE     * * * * *
1470 CLOSE
1480 RUN "TV.BAS"
1490 REM DAY AND INTERVAL INPUT.  TIMEUNIT IS NO. OF 15-MINUTE INTERVALS FROM SUNDAY 00:00 * * * *
1500 COLOR YELLOW
1510 INPUT "WHAT DAY" (1-SUN 2-MON 3-TUE 4-WED 5-THU 6-FRI 7-SAT) ";YOOBI
1520 IF YOOBI<1 OR YOOBI>7 THEN 1510
1530 INPUT "WHAT HOUR (0-23)";HOUR
1540 IF HOUR<0 OR HOUR>23 THEN 1530
1550 INPUT "WHAT MINUTE (00,15,30,45)";MINUTE
```

```
1560 IF MINUTE<0 OR MINUTE>45 OR (MINUTE MOD 15)<>0 THEN 1550
1570 LET TIMEUNIT=((YOOBI-1)*24+HOUR)*4+(MINUTE¥15)
1580 RETURN
1590 REM CHANNEL INPUT    * * * * *
1600 COLOR YELLOW
1610 INPUT "WHAT CHANNEL";CHANNEL
1620 IF CHANNEL<0 OR CHANNEL>MAXCHANNEL THEN 1610
1630 REM STATION IS CHANNEL NO. IN PROGRAM
1640 LET STATION=CHANTABLE(CHANNEL)
1650 IF STATION<0 THEN 1610
1660 RETURN
1670 REM ASK CHANNEL NO. AND START AND END TIMES    * * * * *
1680 REM FIRST CHANNEL NO.
1690 GOSUB 1590
1700 COLOR SKY
1710 PRINT
1720 PRINT "START TIME : "
1730 GOSUB 1490
1740 LET START=TIMEUNIT
1750 REM START IS START TIME AND FINISH IS END TIME
1760 COLOR SKY
1770 PRINT
1780 PRINT "END TIME : "
1790 GOSUB 1490
1800 LET FINISH=TIMEUNIT
1810 RETURN
1820 REM CALCULATE RECORDNO ON THE BASIS OF STATION AND NOW
 * * * *
1830 LET RECORDNO=STATION*TIMELIMIT+NOW
1840 RETURN
1850 REM RECORD INPUT    * * * * *
1860 GOSUB 1820
1870 REM CALCULATE RECORDNO AND INPUT RECORD
1880 GET #1,RECORDNO
1890 RETURN
1900 REM RECORD OUTPUT.  FIRST CALCULATE RECORDNO   * * * * *
1910 GOSUB 1820
1920 PUT #1,RECORDNO
1930 CLOSE #1
1940 REM CLOSE FILE AND OPEN IT.  PRECAUTION OPERATION.
THIS IS ALSO ENTRY
1950 OPEN "R",#1,"BANGUMI.DAT",32
1960 REM LEFT 20 BYTES ARE QUESTIONNAIRE ANSWERS.  RIGHT 12
BYTES ARE UNUSED
1970 RETURN
1980 REM OBTAIN THE NEXT 15-MINUTE INTERVAL    * * * * *
1990 LET NOW=NOW+1
2000 IF NOW TIMELIMIT THEN RETURN
2010 REM NOW IS SAT. 24:00.  UPDATE TIME TO SUN. 00:00
2020 LET NOW=0
2030 RETURN
2040 REM DIVIDE NOW INTO DAY AND TIME AND DISPLAY THEM * * *
 * *
```

```
2050 COLOR GREEN
2060 LET MINUTE=15*(NOW MOD 4)
2070 LET NICHIJI=NOW¥4
2080 LET HOUR=NICHIJI MOD 24
2090 LET YOOBI=(NICHIJI¥24)+1
2100 PRINT CHANNEL;"CHANNEL";DAY$(YOOBI);"DAY ";
RIGHT$(STR$(HOUR),2);":";RIGHT$("0"+MID$(STR$(MINUTE),2),2);
" ";
2110 RETURN
2120 REM EDIT RECORD         * * * * *
2130 LET SCREENX=POS
2140 LET SCREENY=CSRLIN
2150 REM REMEMBER INPUT POSITION
2160 LOCATE 1,1
2170 REM CLEAR SCREEN FOR FUNCTION KEYS
2180 PRINT SPACE$(240);
2190 LOCATE 1,1
2200 COLOR SKY
2210 IF INSURVEY$="" THEN 2250
2220 PRINT "PF0= ";INSURVEY$;"SAME AS PREVIOUS INTERVAL"
2230 REM USE FUNCTION KEYS PF0 AND PF1 FOR INPUTS
2240 KEY 0,INSURVEY$
2250 REM READ RECORD
2260 GOSUB 1850
2270 PRINT "PF1= ";SURVEY$;"SAME CONTENT AS IN PREVIOUS
INTERVAL"
2280 KEY 1,SURVEY$
2290 REM RETURN TO THE ORIGINAL SCREEN POSITION
2300 LOCATE SCREENX,SCREENY
2310 COLOR WHITE
2320 LINE INPUT INSURVEY$
2330 REM INPUT QUESTIONNAIRE CONTENTS.  NO OPERATION FOR
NULL STRINGS
2340 IF INSURVEY$="" THEN RETURN
2350 IF LEN(INSURVEY$)=LEN(SURVEY$) THEN 2410
2360 REM IF LENGTH IS IMPROPER, REWRITE IT.  LENGTH
MISMATCHING
2370 LOCATE SCREENX,SCREENY
2380 PRINT SPACE$(LEN(INSURVEY$));
2390 BEEP
2400 GOTO 2300
2410 REM PREPARE RECORD AND START TO WRITE
2420 LSET SURVEY$=INSURVEY$
2430 ON IFDATE GOTO 2440,2470
2440 REM WRITE VALID START DATE FOR NEW TV PROGRAM
2450 LSET VALIDDATE$=TODAY$
2460 GOTO 1900
2470 REM CHECK THAT DATE IS NOT CHANGED BUT DATA IS NOT NEW
2480 IF VALIDDATE$<>STRING$(LEN(VALIDDATE$),"0") THEN 1900
2490 COLOR RED
2500 PRINT "NEW DATA"
2510 REM CONNECT BUZZER
2520 BEEP 1
```

```
2530 REM AS MARK FOR PROCESSING INTERRUPTION
2540 LET INSURVEY$=""
2550 REM WAIT 3 SECONDS
2560 LET WAITTIME=3
2570 GOSUB 3000
2580 REM STOP BUZZER
2590 BEEP 0
2600 RETURN
3000 REM STOP BUZZER IF WAITTIME HAS ELAPSED
3010 IF WAITTIME<=0 THEN RETURN
3020 REM STOP WHEN WAITTIME HAS ELAPSED
3030 LET THISSECOND$=TIME$
3040 IF THISSECOND$=TIME$ THEN 3040
3050 LET WAITTIME=WAITTIME-1
3060 REM WAIT NEXT SECOND
3070 GOTO 3010

1 '*************************************************
2 '*      PROGRM    --- EDITADR.BAS                 *
3 '*      FUNCTION  --- MAIN                        *
4 '*------------------------------------------------*
5 '*                   1985/3/12                    *
6 '*                   SINWA SYSTEM PRODUCTS        *
7 '*************************************************
110 DEFINT A-Z
120 REM PROGRAM FOR WRITING SUBSCRIBER INFORMATION IN FILE
AND DISPLAYING IT ON MONITOR
130 REM SET SHIFT JIS MODE
140 PRINT CHR$(&H1B);"1";
150 REM CHECK IF PRINTER IS PROPERLY CONNECTED
160 COLOR 4
170 IF (INP(&H62) AND 76)=72 THEN 240
180 PRINT "PREPARE PRINTER"
190 PRINT "IF PREPARED, PRESS RETURN"
200 PRINT "IF NOT PREPARED, PRESS ANOTHER KEY"
210 BEEP
220 IF INPUT$(1)<>CHR$(13) THEN RUN "TV.BAS"
230 GOTO 160
240 COLOR 7
250 OPEN "R",#1,"KYAKU. DAT",128
260 REM DATA IS STORED IN RANDOM FILE OF 128 BYTES PER
RECORD
270 REM ONE-RECORD DATA IS DIVIDED INTO THE FOLLOWING ITEMS
280 REM DATA ITEM NAME, UNUSED BYTE NUMBER AT THE LEFT OF
290 REM ITEMS, BYTE LENGTH OF ITEM, ITEM TYPE NUMBER
300 REM THE ELEMENTS BELOW FOLLOW ITEM TYPE NO.
310 REM 1.  CORRESPONDING TO COBOL PICTURE X(?)
320 REM 2.  CORRESPONDING TO COBOL PICTURE 9(?)
330 REM 3.  NAME (KATAKANA) REQUIRING BLANK BETWEEN FIRST
AND LAST NAMES
340 DATA NAME (KATAKANA),0,16,3
350 DATA YEAR OF BIRTH (LOWER TWO DIGITS IN A.D.),0,2,2
```

```
360 DATA MONTH OF BIRTH,0,2,2
370 DATA DAY OF BIRTH,0,2,2
380 DATA POSTAL CODE,0,6,1
390 DATA ADDRESS,0,40,1
400 DATA NAME (KANJI),0,16,1
410 DATA YEAR OF VALID PERIOD,0,2,2
420 DATA MONTH OF VALID PERIOD,0,2,2
430 DATA DAY OF VALID PERIOD,0,2,2
440 DATA QUESTIONNAIRE ANSWER,10,20,1
450 DATA NO CORRECTION
460 REM "NO CORRECTION" IS NOT REPRESENTED BY ITEM NAME BUT
470 REM BY MARK AT THE END OF DATA.  OPERATOR WHO FINISHES
CORRECTION CAN USE "NO CORRECTION" MARK
480 LET KOOMOKUSUU=0
490 REM COUNT NO. OF ITEMS
500 READ KOOMOKUMEI$
510 IF KOOMOKUMEI$ = "NO CORRECTION" THEN 560
520 LET KOOMOKUSUU=KOOMOKUSUU+1
530 REM ITEM PROCESSING IS NOT YET COMPLETED AND READ DUMMY
DATA
540 READ DUMMY,DUMMY,DUMMY
550 GOTO 490
560 REM NO. OF ITEMS IS DETECTED.  KOOMOKUSUU
570 DIM KOOMOKUMEI$(KOOMOKUSUU),NAKAMI$(KOOMOKUSUU),
580 DIM HYOOJIGYOO(KOOMOKUSUU), SHUBETSU(KOOMOKUSUU)
590 REM ITEM NAME IS KOOMOKUMEI$ AND NAKAMI$ IS ITEM
600 REM CONTENT.  THESE ARE USED IN FIELD STATEMENT SO BE
610 REM SURE TO USE LSET AND RSET.  HYOOJIGYOO IS LINE
NUMBER FOR DISPLAYING ITEM.  SHUBETSU IS THE ITEM TYPE
DESCRIBED ABOVE
620 LET COLUMNIN=30
630 REM COLUMNIN IS THE COLUMN POSITION FOR DISPLAYING ITEM
CONTENT
640 LET KETAICHI=0
650 REM KETAICHI IS USED TO CALCULATE THE START BYTE
POSITION OF RECORD FOR ITEM
660 CLS1
670 REM SCREEN DELETE.  READ DATA AGAIN
680 RESTORE
690 FOR KOOMOKUBANGOO=1 TO KOOMOKUSUU
700 LET HYOOJIGYOO(KOOMOKUBANGOO)=CSRLIN
710 REM DETERMINE DISPLAY LINE OF (KOOMOKUBANGOO)TH ITEM
720 READ KOOMOKUMEI$(KOOMOKUBANGOO),HIDARIAKI,BYTENAGA,
SHUBETSU(KOOMOKUBANGOO)
730 REM CALCULATE NECESSARY NUMBER OF LINES FOR CURRENT ITEM
WITH CURSOR
740 LOCATE COLUMNIN,HYOOJIGYOO(KOOMOKUBANGOO)
750 PRINT SPACE$(BYTENAGA)
760 LET KETAICHI=KETAICHI+HIDARIAKI
770 REM KETAICHI REPRESENTS BYTE POSITION TO THE LEFT OF
ITEM IN BUFFER
780 FIELD #1,KETAICHI AS DUMMY$,BUTENAGA AS
NAKAMI$(KOOMOKUBANGOO)
790 REM ASSIGN ITEM CONTENT TO BUFFER
```

```
800 LET KETAICHI=KETAICHI+BYTENAGA
810 REM KETAICHI REPRESENTS POSITION TO THE RIGHT OF ITEM
820 NEXT KOOMOKUBANGOO
830 REM INITIALIZATION OF DUMMY ITEMS WITHOUT CORRECTION
840 RED KOOMOKUMEI$(0)
850 LET HYOOJIGYOO(0)=CSRLIN+1
860 PRINT "PLEASE WAIT"
870 REM LEFT 22 BYTES ARE ASSIGNED FOR     KEY
880 FIELD #1,22 AS KOJINKEY$
890 REM FOR EASILY SAVING DATA OF ONE SUBSCRIBER
900 FIELD #1,128 AS ONEPERSON$
910 REM KIGEN$ IS THE VALID DATE
920 FIELD #1,84 AS DUMMY$,6 AS KIGEN$
930 LET HASHSIZE=8209
940 REM HASHSIZE IS THE SIZE OF ARRAY FOR CONVOLUTION
FUNCTION.  PRIME NUMBER
950 DIM RECORDNO(HASHSIZE),HASH(HASHSIZE)
960 REM DETAILED DESCRIPTION OF RECORDNO AND HASH IS IN
RECORD CALL SUBROUTINE
970 IF LOF(1)>0 THEN 1010
980 REM IF FILE ALREADY EXITS, JUMP
990 REM FILE IS USED FOR THE FIRST TIME HERE AND INITIALIZE
INDEX FILE
1000 GOSUB 4680
1010 REM READ RECORDNO AND HASH FROM INDEX FILE
1020 OPEN "R",#2,"KYAKU.IDX",2
1030 FIELD #2,2 AS RECORDNO$
1040 IF LOC(2)<>0 THEN PRINT "READ ERROR":BEEP
1050 FOR I=1 TO HASHSIZE
1060 GET #2
1070 LET RECORDNO(I)=CVI(RECORDNO$)
1080 NEXT I
1090 FOR I=1 to LOF(1)
1100 GET #2
1110 LET HASH(I)=CVI(RECORDNO$)
1120 NEXT I
1130 CLOSE #2
1140 LET NUMKEYS=4
1150 REM FIRST FOUR ITEMS REPRESENTS CREATION OF KEY
1160 REM COLOR INITIALIZATION
1170 LET GREEN=2
1180 LET RED=4
1190 LET YELLOW=6
1200 LET WHITE=7
1210 LET SKY=3
1220 LET PURPLE=5
1230 REM
1240 REM OPERATOR SELECTS GYOOMU (JOB)
1250 CLS 1
1260 REM SCREEN DELETE
1270 PRINT
1280 COLOR RED
1290 PRINT "INDIVIDUAL DATA EDITING PROGRAM"
1300 PRINT
```

```
1310 COLOR GREEN
1320 PRINT "1.  NEW SUBSCRIBER INPUT PROCESSING"
1330 PRINT "2.  DATA CHECK/CORRECTION PROCESSING"
1340 PRINT "3.  SUBSCRIBER KEYWORD EXPIRATION DATA
PROCESSING"
1350 PRINT "4.  END"
1360 PRINT
1370 COLOR YELLOW
1380 INPUT "WHAT NO.";GYOOMU
1390 CLS 1
1400 ON GYOOMU GOSUB 1440,1520,1850,4240
1410 REM BRANCH TO GYOOMU OR JOB SUBROUTINE
1420 GOTO 1240
1430 REM
1440 REM NEW SUBSCRIBER INPUT
1450 REM INPUT DATA
1460 GOSUB 3430
1470 REM SAVE INPUT DATA ON DISK
1480 GOSUB 3680
1490 REM ASK FOR REPETITION
1500 RETURN
1510 REM
1520 REM CHECK AND CORRECTION
1530 DISPLAY ITEM NAME
1540 GOSUB 3340
1550 FOR KOOMOKUBANGOO=1 to NUMKEYS
1560 REM INPUT ONLY KEY ITEM
1570 GOSUB 2950
1580 NEXT KOOMOKUBANGOO
1590 REM ACCESS RECORD FROM DISK
1600 GOSUB 2580
1610 REM IF FOUND, JUMP
1620 IF RECORDNO(FIRSTHASH)>0 THEN 1780
1630 REM TARGET SUBSCRIBER NOT FOUND
1640 LOCATE 1,HYOOJIGYOO(0)+2
1650 PRINT "NOT FOUND. NEW SUBSCRIBER";
1660 BEEP
1670 GOSUB 4100
1680 IF KOTAE$="N" THEN 1820
1690 REM INPUT NON KEY ITEMS
1700 FOR KOOMOKUBANGOO=NUMKEYS+1 TO KOOMOKUSUU
1710 GOSUB 2950
1720 NEXT KOOMOKUBANGOO
1730 REM ACCEPT CORRECTION
1740 GOSUB 3520
1750 REM SAVE AS NEW DATA ON DISK
1760 GOSUB 3680
1770 GOTO 1820
1780 REM RECORD OF THIS SUBSCRIBER IS READ AND NOW ACCEPT
CORRECTION
1790 GOSUB 3520
1800 REM UPDATE DATA ON SAME RECORD OF DISK
1810 GOSUB 4020
1820 REM ASK FOR FURTHER CHECK OR CORRECTION?
```

```
1830 RETURN
1840 REM
1850 REM TRASH COLLECTION SUBROUTINE
1860 COLOR YELLOW
1870 PRINT "WHAT IS DATE TODAY?";DATE$;
1880 GOSUB 4100
1890 REM RECEIVE ANSWER
1900 IF KOTAE$="Y" THEN 1930
1910 INPUT "CORRECT DATE?";NEWDATE$
1920 DATE$=NEWDATE$
1930 REM DATE IS CORRECT
1940 INPUT "PREDETERMINED PERIOD AFTER SUBSCRIBER EXPIRATION
DATE IN ORDER TO DELETE DATE OF CORRESPONDING
SUBSCRIBERS";OVERDUE
1950 IF OVERDUE<0 OR OVERDUE>120 THEN 1940
1960 REM LIMIT IS 10 YEARS
1970 LET OVERDUE!=(100*(OVERDUE¥12)+(OVERDUE MOD 12))*100
1980 REM OVERDUE! IS IN THE FORM OF DATE. 20500 is TWO
YEARS, FIVE MONTHS, AND ZERO DAYS.
1990 LET TODAY!=VAL(LEFT$(DATE$,2)+MID$(DATE$,4,2)
+RIGHT$(DATE$,2))
2000 REM TODAY! IS TODAY'S DATE IN THE SAME FORM AS OVERDUE!
2010 REM CHANGE PREVIOUS FILE TO BACKUP FILE
2020 CLOSE
2030 LET NEWFILE$="KYAKU.BAK"
2040 LET OLDFILE$="KYAKU.DAT"
2050 GOSUB 4610
2060 LET NEWFILE$="KYAKU.IX2"
2070 LET OLDFILE$="KYAKU.IDX"
2080 GOSUB 4610
2090 REM FOR RESTORING DATA EVEN IF ERROR OCCURS
2100 ON ERROR GOTO 4270
2110 GOSUB 4680
2120 REM CREATE NEW INDEX FILE
2130 REM OPEN OLD AND NEW FILES
2140 OPEN "R",#1,"KYAKU.DAT",128
2150 OPEN "R",#1,"KYAKU.BAK",128
2160 FIELD #3,128 AS OLDPERSON$
2170 FOR OLDRECNO=1 to LOF(3)
2180 REM ASSUME TRANSFER OF (OLDRECNO)TH SUBSCRIBER IN OLD
FILE
2190 GET #3,OLDRECNO
2200 REM TRANSFER DATA TO BUFFER OF NEW FILE
2210 LSET ONEPERSON$=OLDPERSON$
2220 REM KIGEN$ IS ONLY NUMERALS
2230 FOR I=1 to LEN(KIGEN$)
2240 LET DIGIT$=MID$(KEGEN$,I,1)
2250 IF DIGIT$<"0" OR DIGIT$>"9" THEN 2350
2260 NEXT I
2270 REM THE PERIOD IS ONLY NUMERALS. TIMEDEAD! IS THE
PERIOD AFTER DUE    YYMMDD
2280 LET TIMEDEAD!=TODAY!-VAL(KIGEN$)
2290 LET EXPIRE!=TIMEDEAD!-OVERDUE!
2300 REM EXPIRE! INDICATES DATE AFTER PREDETERMINED PERIOD
```

OF TIME AFTER DUE    YYMMDD
2310 REM ADJUSTMENT FOR CHANGING GENERATIONS. ONE GENERATION IS 30 YEARS
2320 IF ABS(EXPIRE!)>300000! THEN LET EXPIRE!=EXPIRE!-SGN(EXPIRE!)*1000000!
2330 IF ABS(EXPIRE!)<=300000! THEN 2460
2340 REM JUMP IF TIME LAPSE FALLS WITHIN 30 YEARS
2350 REM VALID DATE IS UNCLEAR SO ASK OPERATOR TO JUDGE IT
2360 GOSUB 4440
2370 REM DISPLAY
2380 COLOR RED
2390 PRINT "VALID DATE OF THIS SUBSCRIBER IS UNCLEAR, DELETE IT?";
2400 BEEP
2410 GOSUB 4100
2420 REM ANSWER IS MADE
2430 IF KOTAE$="N" THEN 2490
2440 REM DELETE PROCEDURES WILL BE MADE
2450 GOTO 2510
2460 REM COMPUTER DETERMINES WHETHER DELETE IS PERFORMED
2470 REM FOR TEST RUN
2480 IF EXPIRE! 0 THEN 2440
2490 REM TRANSFER WITHOUT DELETE AND STORE IT ON DISK
2500 GOSUB 3680
2510 NEXT OLDRECNO
2520 ON ERROR GOTO 0
2530 REM EVEN IF ERROR IS PRESENT, NO DATA IS LOST. CLOSE THE OLD FILE
2540 CLOSE #3
2550 RETURN
2560 REM
2570 REM
2580 REM READ CORRECT RECORD ACCORDING TO KOJINKEY$
2590 LET SPAREKEY$=KOJINKEY$
2600 REM SAVE KEY IN SPAREKEY$
2610 REM FIRSTHASH IS THE RESULT OF CONVOLUTION FUNCTION.
2620 REM REHASH IS USED IF COLLISION OCCURS IN CONVOLUTION FUNCTION.
2630 LET FIRSTHASH=0
2640 LET REHASH=0
2650 FOR I=1 TO LEN(KOJINKEY$)-1 STEP 2
2660 LET FIRSTHASH=(FIRSTHASH+FIRSTHASH+ASC(MID$(KOJINKEY$,I))) MOD HASHSIZE
2670 LET REHASH=(REHASH+REHASH+ASC(MID$(KOJINKEY$,I+1))) MOD (HASHSIZE-1)
2680 NEXT I
2690 LET FIRSTHASH=FIRSTHASH+1
2700 REM RECORDNO(FIRSTHASH)=0 IS THE MARK OF INVALID KEY. TARGET SUBSCRIBER IS NOT FOUND
2710 IF RECORDNO(FIRSTHASH)=0 THEN RETURN
2720 IF HASH(RECORDNO(FIRSTHASH))<>REHASH THEN 2860
2730 REM CORRECT RECORD IS PROBABLY FOUND. IF NOT, JUMP
2740 GET #1,RECORDNO(FIRSTHASH)
2750 IF SPAREKEY$<>KOJINKEY$ THEN 2860
2760 REM IF ACTUAL KEY IS INCORRECT, JUMP. HOWEVER, AS KEY

IS CORRECT, ASK OPERATOR FOR CONFIRMATION
2770 FOR KOOMOKUBANGOO=NUMKEYS+1 TO KOOMOKUSUU
2780 REM DISPLAY OF THE TARGET SUBSCRIBER
2790 GOSUB 2900
2800 NEXT KOOMOKUBANGOO
2810 LOCATE 1,HYOOJIGYOO(0)+2
2820 PRINT "RIGHT SUBSCRIBER?"
2830 GOSUB 4100
2840 REM ASK FOR ANSWER
2850 IF KOTAE$="Y" THEN RETURN
2860 REM WRONG SUBSCRIBER IN FIRSTHASH AND SEARCH FOR ANOTHER SUBSCRIBER.
2870 LET FIRSTHASH=(FIRSTHASH+REHASH) MOD HASHSIZE)+1
2880 GOTO 2700
2890 REM
2900 REM DISPLAY CONTENT OF (KOOMOKUBANGOO)TH ITEM
2910 LOCATE COLUMNIN,HYOOJIGYOO(KOOMOKUBANGOO)
2920 PRINT NAKAMI$(KOOMOKUBANGOO);
2930 RETURN
2940 REM
2950 REM INPUT (KOOMOKUBANGOO)TH ITEM
2960 COLOR GREEN
2970 LOCATE COLUMNIN,HYOOJIGYOO(KOOMOKUBANGOO)
2980 REM CLEAR SCREEN LOCATION SUBJECTED TO INPUT
2990 LET BYTENAGA=LEN(NAKAMI$(KOOMOKUBANGOO))
3000 PRINT SPACE$(BYTENAGA);
3010 LOCATE COLUMNIN,HYOOJIGYOO(KOOMOKUBANGOO)
3020 REM ACTUAL DATA INPUT
3030 LINE INPUT NYUURYOKU$
3040 REM TRANSFER DATA TO BUFFER ACCORDING TO ITEM TYPE
3050 ON SHUBETSU(KOOMOKUBANGOO) GOSUB 3140,3180,3220
3060 REM CAUTION IF INPUT IS TOO LONG
3070 IF BYTENAGA>=LEN(NYUURYOKU$) THEN RETURN
3080 LOCATE COLUMNIN,HYOOJIGYOO(KOOMOKUBANGOO)
3090 REM DELETE OPERATOR INPUT
3100 PRINT SPACE$(LEN(NYUURYOKU$));
3110 BEEP
3120 REM DISPLAY OF ACTUAL INPUT
3130 GOTO 2900
3140 REM WRITE DATA IN BUFFER OF SHUBETSU=1
3150 LSET NAKAMI$(KOOMOKUBANGOO)=NYUURYOKU$
3160 REM THE SAME AS COBOL PICTURE X(?)
3170 RETURN
3180 REM WRITE DATA IN BUFFER OF SHUBETSU=2
3190 RSET NAKAMI$(KOOMOKUBANGOO)=STRING$(BYTENAGA,"0")+NYUURYOKU$
3200 REM THE SAME AS COBOL PICTURE 9(?)
3210 RETURN
3220 REM WRITE DATA IN BUFFER OF SHUBETSU=3
3230 REM FOR NAME (KATAKANA) REQUIRING BLANK IN NYUURYOKU$
3240 IF INSTR(NYUURYOKU$," ")>0 THEN 3140
3250 REM IF BLANK IS FOUND, THE SAME AS SHUBETSU=1
3260 REM NO BLANK IS FOUND
3270 LOCATE 1,HYOOJIGYOO(0)+2

```
3280 PRINT "INSERT BLANK BETWEEN FIRST AND LAST NAMES. IF"
3290 PRINT "BLANK CANNOT BE USED, ADD BLANK AFTER THE ENTIRE NAME."
3300 BEEP
3310 REM DO IT AGAIN
3320 GOTO 2950
3330 REM
3340 REM DISPLAY ALL ITEM NAMES
3350 COLOR SKY
3360 FOR KOOMOKUBANGOO=0 TO KOOMOKUSUU
3370 LOCATE 1,HYOOJIGYOO(KOOMOKUBANGOO)
3380 PRINT KOOMOKUBANGOO;KOOMOKUMEI$(KOOMOKUBANGOO);
3390 NEXT KOOMOKUBANGOO
3400 RETURN
3410 REM DISPLAY NO CORRECTION WITH DUMMY ITEMS
3420 REM
3430 REM INPUT ALL ITEMS
3440 REM DISPLAY ITEM NAME
3450 GOSUB 3340
3460 REM INPUT CONTENT
3470 FOR KOOMOKUBANGOO=1 to KOOMOKUSUU
3480 GOSUB 2950
3490 NEXT KOOMOKUBANGOO
3500 REM ENTER CORRECTION SUBROUTINE
3510 REM
3520 REM ACCEPT CONTENT CORRECTION OF ITEMS DISPLAYED ON SCREEN
3530 COLOR YELLOW
3540 LOCATE 1,HYOOJIGYOO(0)+2
3550 INPUT "WHICH ONE IS TO BE CORRECTED?";KOOMOKUBANGOO
3560 IF KOOMOKUBANGOO=0 THEN RETURN
3570 REM IF NO CORRECTION IS MADE, EXIT SUBROUTINE
3580 IF KOOMOKUBANGOO<1 OR KOOMOKUBANGOO>KOOMOKUSUU THEN 3630
3590 REM WATCH STRANGE ITEM NUMBERS AND INPUT NECESSARY DATA
3600 GOSUB 2950
3610 GOTO 3520
3620 REM REQUEST NEXT CORRECTION
3630 REM WRONG ITEM NO. IS RECEIVED
3640 BEEP
3650 REM DO IT AGAIN
3660 GOTO 3520
3670 REM
3680 REM DATA OF ONEPERSON$ IS STORED ON DISK
3690 REM SAVE CONTENT OF BUFFER
3700 LET EXTRAPERSON$=ONEPERSON$
3710 REM OBTAIN CONVOLUTION FUNCTION (HASH)
3720 GOSUB 2580
3730 REM IF NEW DATA AS EXPECTED IS OBTAINED, JUMP
3740 IF RECORDNO(FIRSTHASH)=0 THEN 3810
3750 REM DATA OF TARGET SUBSCRIBER IS ALREADY ON DISK
3760 LOCATE 1,HYOOJIGYOO(0)+2
3770 PRINT "CHANGE?"
3780 REM FIND ANSWER
3790 GOSUB 4100
```

```
3800 IF KOTAE$="Y" THEN RETURN
3810 REM DATA IS CONFIRMED AS THAT OF NEW SUBSCRIBER
3820 LET RECORDNO(FIRSTHASH)=LOF(1)+1
3830 LET HASH(RECORDNO(FIRSTHASH)=REHASH
3840 REM DETAILS OF RECORDNO AND HASH ARE IN CONVOLUTION FUNCTION SUBROUTINE
3850 REM THE ABOVE CHANGES ARE RECORDED IN FILE KYAKU.IDX
3860 OPEN "R",#2,"KYAKU.IDX",2
3870 REM STORE RECORDNO(FIRSTHASH)
3880 LSET RECORDNO$=MKI$(RECORDNO(FIRSTHASH))
3890 PUT #2,FIRSTHASH
3900 REM STORE HASH(RECORDNO(FIRSTHASH))
3910 LSET RECORDNO$=MKI$(HASH(RECORDNO(FIRSTHASH)))
3920 PUT #2,HASHSIZE+RECORDNO(FIRSTHASH)
3930 CLOSE #2
3940 LSET ONEPERSON$=EXTRAPERSON$
3950 REM RESTORE BUFFER
3960 PUT #1,RECORDNO(FIRSTHASH)
3970 CLOSE #1
3980 REM INSERT OPEN AND CLOSE FOR PRECAUTION
3990 OPEN "R",#1,"KYAKU.DAT",128
4000 RETURN
4010 REM
4020 REM THE ALREADY REGISTERED DATA IS CORRECTED AND UPDATED DATA IS OUTPUT TO THE SAME RECORD
4030 REM IF KEY IS NOT CHANGED, OPERATION IS SIMPLE
4040 IF KOJINKEY$=SPAREKEY$ THEN 3960
4050 REM RECORDNO(FIRSTHASH) CANNOT BE USED. ALTHOUGH
4060 REM INHIBITION MARK IS PREFERRED, IT IS NOT ATTACHED HERE.
4070 REM KEY IS CHANGED AND DATA IS DEFINED AS NEW RECORD
4080 GOTO 3680
4090 REM
4100 REM ASK FOR OPERATOR ANSWER (Y/N). RETURN TO KOTAE$
4110 COLOR YELLOW
4120 REM FOR CHECKING AGAIN ON THE SAME SCREEN POSITION IF STRANGE ANSWER IS FOUND
4130 LET SCREENX=POS
4140 LET SCREENY=CSRLIN
4150 LINE INPUT "(Y/N)?";KOTAE$
4160 REM CHANGE SMALL LETTERS TO CAPITAL LETTERS
4170 IF KOTAE$>="a" AND KOTAE$<="z" THEN LET KOTAE$=CHR$(ASC(KOTAE$)+ASC("A")-ASC("a"))
4180 IF KOTAE$="Y" OR KOTAE$="N" THEN RETURN
4190 REM STRANGE ANSWER IS FOUND AND RETURN TO THE PREVIOUS SCREEN POSITION
4200 LOCATE SCREENX,SCREENY
4210 BEEP
4220 GOTO 4150
4230 REM
4240 REM SUBROUTINE TERMINATING FOR TEST RUN
4250 COLOR WHITE
4260 RUN "TV.BAS"
4270 REM FOR RESTORING DATA EVEN IF ERROR OCCURS DURING
```

```
TRASH COLLECTION
4280 CLOSE
4290 REM OLD FILE IS DEFINED AS NEW FILE
4300 LET NEWFILE$="KYAKU.DAT"
4310 LET OLDFILE$="KYAKU.BAK"
4320 GOSUB 4610
4330 LET NEWFILE$="KYAKU.IDX"
4340 LET OLDFILE$="KYAKU.IX2"
4350 GOSUB 4610
4360 COLOR RED
4370 PRINT "TRASH COLLECTION FAILED.  SYSTEM MAY BE CORRECTED IF UNNECESSARY FILES ARE DELETED"
4380 BEEP
4390 ON ERROR GOTO 0
4400 STOP
4410 RESUME 4420
4420 RETURN
4430 REM
4440 REM DISPLAY OF SUBSCRIBER DATA CURRENTLY FILED IN BUFFER.  FIRST CLEAR SCREEN.
4450 CLS 1
4460 GOSUB 3340
4470 FOR KOOMOKUBANGOO=1 TO KOOMOKUSUU
4480 REM DISPLAY OF (KOOMOKUBANGOO)TH ITEM
4490 GOSUB 2900
4500 NEXT KOOMOKUBANGOO
4510 REM FOR EASY REMARKS
4520 LOCATE 1,HYOOJIGYOO(0)+2
4530 RETURN
4540 REM
4550 REM DELETE KILLFILE$ TO PREVENT ERROR
4560 OPEN "O",#3,KILLFILE$
4570 REM SAVE FILE SO AS NOT TO FAIL KILL COMMAND
4580 CLOSE #3
4590 KILL KILLFILE$
4600 RETURN
4610 REM EXECUTION OF NAME OLDFILE$ AS NEWFILE$.  IF
4620 REM NEWFILE$ IS PRESENT, IT IS LOST WITHOUT ERROR.
4630 LET KILLFILE$=NEWFILE$
4640 GOSUB 4550
4650 NAME OLDFILE$ AS NEWFILE$
4660 RETURN
4670 REM
4680 REM INDEX FILE INITIALIZATION
4690 OPEN "O",#2,"KYAKU.IDX"
4700 REM FOR INDICATING ANY RECORDNO IS INITIALLY 0.
4710 FOR I=1 TO HASHSIZE
4720 PRINT #2,MKI$(0);
4730 LET RECORDNO(I)=0
4740 NEXT I
4750 CLOSE #2
4760 RETURN
```

```
1  '*********************************************************
2  '*        PROGRM  --- MAKECHART.BAS (TEST)               *
3  '*        FUNCTION --- MAIN                              *
4  '*------------------------------------------------------*
5  '*                              1985/3/12                *
6  '*                              SINWA SYSTEM PRODUCTS    *
7  '*********************************************************
```

110 REM TEST PROGRAM FOR EVALUATING TV PROGRAMS
120 RANDOMIZE VAL(RIGHT$(TIME$,2))
130 DEF FNBINRND=-(RND<.5)
140 REM FNBINRND IS TO RANDOMLY SELECT 0 OR 1
150 INPUT "NO. OF QUESTIONS";NUMQUES
160 INPUT "NO. OF ANSWERS";NUMANS
170 REM NUMQUES IS NO. OF QUESTIONS AND NUMANS IS NO. OF ANSWERS.
180 LET N=NUMQUES*2*(NUMANS-1)
190 INPUT "NO. OF CHANNELS";M
200 REM N IS NO. OF CONDITIONS AND M IS NO. OF CHANNELS.
210 DIM ACTC(N),RPOGC(N),P(N),ACTCP(N),PROGCP(N),T(M,N), ACTL(M),PROGL(M)
220 REM ACTC IS ACTUAL COEFFICIENT, PROGC IS COEFFICIENT
230 REM ESTIMATED BY PROGRAM, AND P(J) DETERMINED IF SUBSCRIBER MATCHES WITH JTH CONDITION. YES=1. NO=0
240 REM ACTCP=ACTC*P. PROGCP=PROGC*P. T(I,J) DETERMINES IF
250 REM ITH PROGRAM MATCHES WITH JTH CONDITION. ACTL(I) IS
260 REM INDEX REPRESENTING THAT SUBSCRIBER LIKES OR DISLIKES ITH PROGRAM. A LARGER INDEX VALUE INDICATES A HIGHER DEGREE OF PREFERENCE. PROGL(I) IS VALUE OF ACTL(I) ESTIMATED BY PROGRAM.
270 REM NUMCLAIMS IS NO. OF RECORDED COMPLAINTS.
280 LET NUMCLAIMS=0
290 REM MAXCLAIMS IS UPPER LIMIT OF COMPLAINTS TO BE RECORDED. THE ARRAY CAPACITY IS 64 KBYTES.
300 LET MAXCLAIMS=16383¥(N+1)-1
310 PRINT "MAXCLAIMS=";MAXCLAIMS
320 DIM OLDDIF(MAXCLAIMS,N),V(MAXCLAIMS),DELTAC(N)
330 REM LET OLDDIF(H,J)=(P(J)*(T(K,J)-T(I,J)),J=1,....N. FOR
340 REM HTH COMPLAINT. OTHER VARIABLES ARE VALUES UPON OCCURRENCE OF COMPLAINTS. V WILL BE EXPLAINED LATER.
350 DIM GROUPSIZE(2),GROUP(2,MAXCLAIMS),HITZERO(MAXCLAIMS), CDELTAC(MAXCLAIMS)
360 REM COMPLAINTS ARE DIVIDED INTO THREE GROUPS: GROUP WITH
370 REM VIOLATION (PLUS); GROUP WITHOUT VIOLATION (MINUS);
380 REM AND GROUP MARGINALLY SATISFACTORY (FIXZERO). GROUPSIZE(*) IS GROUP SIZE, E.G., GROUP(*,1),GROUP(*,2),...,
390 REM GROUP(*,GROUPSIZE(*)) IS GROUP MEMBER
400 REM HITZERO IS THE NUMBER OF TIMES OF CROSSING BETWEEN
410 REM GROUP WITH VIOLATION AND GROUP WITHOUT VIOLATION. CDELTAC IS THE INNER PRODUCT OF DELTAC AND OLDDIF.
420 DIM MYGROUP(MAXCLAIMS),MYNUMBER(MAXCLAIMS), OLDGROUP(MAXCLAIMS)
430 REM MYGROUP AND MYNUMBER ARE COMPLAINT GROUP AND COMPLAINT NUMBER IN EACH GROUP.

```
440 REM OLDGROUP IS GROUP TO WHICH COMPLAINT PREVIOUSLY
BELONGED.
450 LET FIXZERO=2
460 LET PLUS=1
470 LET MINUS=0
480 LET NUMTRY=1000
490 REM NUMTRY IS NO. OF TEST RUNS.
500 REM ACTUAL AND ESTIMATED COEFFICIENT INITIALIZATION
510 FOR J=1 TO N
520 LET ACTC(J)=RND
530 LET PROGC(J)=1
540 NEXT J
550 FOR TRY=1 TO NUMTRY
560 REM (TRY)TH CHALLENGE
570 FOR JQUES=1 TO NUMQUES
580 REM CALCULATION OF CONDITION FOR (JQUES)TH QUESTION
590 LET PSURVEY=INT(RND*NUMANS)+1
600 REM PSURVEY IS NO. OF SUBSCRIBER ANSWER.
610 FOR JANS=1 TO NUMANS-1
620 LET J=(JQUES-1)*2*(NUMANS-1)+JANS
630 REM CALCULATION FOR DETERMINING WHETHER SUBSCRIBER
MATCHES WITH JTH AND (J+NUMANS-1)TH CONDITIONS
640 LET P(J)=-(PSURVEY<=JANS)
650 LET P(J+NUMANS-1)=1-P(J)
660 NEXT JANS
670 FOR I=1 TO M
680 REM CALCULATION OF CONDITION FOR (JQUES)TH QUESTION OF
ITH PROGRAM AS EXECUTED ABOVE
690 LET TSURVEY=INT(RND*NUMANS)+1
700 REM ISURVEY IS ANSWER NO.
710 FOR JANS=1 TO NUMANS-1
720 LET J=(JQUES-1)*2*(NUMANS-1)+JANS
730 LET T(I,J)=-(TSURVEY<=JANS)
740 LET T(I,J+NUMANS-1)=1-T(I,J)
750 NEXT JANS
760 NEXT I
770 NEXT JQUES
780 FOR I=1 TO M
790 REM START OF CALCULATION FOR TESTE
800 LET ACTL(I)=0
810 LET PROGL(I)=0
820 NEXT I
830 FOR J=1 TO N
840 LET ACTCP(J)=ACTC(J)*P(J)
850 LET PROGCP(J)=PROGC(J)*P(J)
860 FOR I=1 TO M
870 REM CALCULATION OF INFLUENCE ON TASTE
880 LET ACTL(I)=ACTCP(J)*T(I,J)+ACTL(I)
890 LET PROGL(I)=PROGCP(J)*T(I,J)+PROGL(I)
900 NEXT I
910 NEXT J
920 REM OUTPUT OF VALUE REPRESENTING TASTE.  CALCULATION AND
OUTPUT OF CORRELATION COEFFICIENT FOR ACTUAL TASTE AND
ESTIMATED TASTE
930 IF SHOW THEN PRINT "ACTL=";
```

```
940 LET SUMACT=0
950 FOR I=1 TO M
960 IF SHOW THEN PRINT ACTL(I);
970 LET SUMACT=SUMACT+ACTL(I)
980 NEXT I
990 IF SHOW THEN PRINT
1000 LET AVEACT=SUMACT/M
1010 IF SHOW THEN PRINT "PROGL=";
1020 LET SUMPROG=0
1030 FOR I=0 TO M
1040 IF SHOW THEN PRINT PROGL(I);
1050 LET SUMPROG=SUMPROG+PROGL(I)
1060 NEXT I
1070 IF SHOW THEN PRINT
1080 LET AVEPROG=SUMPROG/M
1090 LET ACTPROG=0
1100 LET ACT2=0
1110 LET SUM2=0
1120 LET PROG2=0
1130 FOR I=1 TO M
1140 LET ACT2=ACT2+(ACTL(I)-AVEACT)^2
1150 LET PROG2=PROG2+(PROGL(I)-AVEPROG)^2
1160 LET ACTPROG=ACTPROG+(ACTL(I)-AVEACT)*(PROGL(I)-AVEPROG)
1170 NEXT I
1180 IF ACT2*PROG2>0 THEN PRINT "TRY="; TRY,"CORRELATION COEFFICIENT =";ACTPROG/SQR(ACT2*PROG2)
1190 REM CALCULATION OF PROGRAM RECOMMENDATION AND ACTUAL SUBSCRIBER TASTE
1200 LET K=1
1210 LET I=1
1220 REM K IS ACTUAL TASTE AND I IS PROGRAM NO. RECOMMENDED BY COMPUTER.
1230 FOR J=2 TO M
1240 IF ACTL(J)>ACTL(K) THEN LET K=J
1250 IF PROGL(J)>PROGL(I) THEN LET I=J
1260 NEXT J
1270 REM IF SUBSCRIBER'S FAVORITE PROGRAM COINCIDES WITH PROGRAM RECOMMENDED BY COMPUTER, NO COMPLAINT IS MADE.
1280 IF I=K THEN 2720
1290 REM COMPLAINT IS MADE. PROGC MUST BE ADJUSTED.
1300 IF ACTL(K)>=ACTL(I)+.1 THEN 1330
1310 PRINT "SMALL COMPLAINT NOT TO BE HANDLED. VIOLATION=";ACTL(K)-ACTL(I)
1320 GOTO 2590
1330 LET NUMCLAIMS=NUMCLAIMS+1
1340 REM COUNTING OF NO. OF COMPLAINTS
1350 IF NUMCLAIMS<=MAXCLAIMS THEN 1390
1360 PRINT "NO ROOM FOR COMPLAINTS"
1370 BEEP
1380 END
1390 FOR J=1 TO N
1400 LET OLDDIF(NUMCLAIMS,J)=P(J)*(T(K,J)-T(I,J))
1410 REM OLDDIF(NUMCLAIMS,J) REPRESENT THE ROLE OF JTH
1420 REM CONDITION DUE TO DIFFERENCE BETWEEN KTH AND ITH PROGRAMS
```

```
1430 NEXT J
1440 REM LINEAR PROGRAMMING SOLVES ALL COLLECTED
1450 REM COMPLAINTS.
1460 FOR GROUPNAME=MINUS TO FIXZERO
1470 LET GROUPSIZE(GROUPNAME)=0
1480 REM FOR CLASSIFICATION INTO GROUPS
1490 NEXT GROUPNAME
1500 FOR H=1 TO NUMCLAIMS
1510 LET V(H)=1
1520 REM V(H) IS INDEX OF VIOLATION FOR HTH COMPLAINT.
1530 REM V(H) =0 REPRESENTS NO VIOLATION.
1540 LET HITZERO(H)=0
1550 REM CHECK ALL COMPLAINTS WHICH DO NOT CROSS BETWEEN
GROUPS WITH AND WITHOUT VIOLATION
1560 FOR J=1 TO N
1570 LET V(H)=V(H)-PROGC(J)*OLDDIF(H,J)
1580 NEXT J
1590 REM THIS COMPLAINT IS DEFINED TO BELONG TO GROUP
1600 LET NEWGROUP=-(V(H)>0)
1610 GOSUB 2850
1620 NEXT H
1630 REM
1640 REM   * * * * * ASSUME NEXT COUNTERMEASURES * * * * *
1650 REM
1660 IF GROUPSIZE(PLUS)=0 THEN 2590
1670 REM NO OPERATION IF COMPLAINTS BELONGING TO GROUP WITH
VIOLATION ARE NOT DETECTED.
1680 REM PROPOSAL OF COUNTERMEASURES AS VIOLATION IS STILL
DETECTED.
1690 FOR J=1 TO N
1700 LET DELTAC(J)=0
1710 REM DELTAC IS PROPOSAL OF COUNTERMEASURES.
1720 FOR MEMBER=1 TO GROUPSIZE(PLUS)
1730 LET DELTAC(J)=DELTAC(J)+OLDDIF(GROUP(PLUS,MEMBER),J)
1740 NEXT MEMBER
1750 NEXT J
1760 REM VIOLATION OF GROUP WITH VIOLATION IS REDUCED BY
PROGC=PROGC-W*DELTAC,W>0.
1770 REM IF MEMBERS BELONGING TO GROUPS WITH AND WITHOUT
VIOLATION ARE PLOTTED NEAR BOUNDARY BETWEEN THEM, IT IS
UNKNOWN THAT DELTAC CAN IMPROVE VIOLATION.
1780 REM V OF KERNEL MEMBER MUST BE FIXED TO 0.
1790 REM ORTHOGONAL MAPPING BETWEEN DELTAC AND KERNEL IS
PERFORMED.
1800 GOSUB 2910
1810 REM ARE KERNEL MEMBERS FULL?. IS IT POSSIBLE TO
1820 REM IMPROVE PLUS GROUP WHILE FIXZERO GROUP IS FIXED?
1830 IF FIRSTDOT<=FIRSTDOT+LASTDOT THEN 2020
1840 REM FIRSTDOT IS ORIGINAL DELTAC*DELTAC (INNER PRODUCT).
1850 REM DIFDOT(0,0) IS ORTHOGONALLY MAPPED DELTAC*DELTAC
1860 REM ORTHOGONALLY MAPPED DELTAC IS INSIGNIFICANT.
REMOVE (KICKOUT)TH MEMBER FROM KERNEL GROUP.
1870 IF WARNING=2 THEN 2590
1880 REM STOP OPERATION IF EVERY MEMBER IS REMOVED TWICE AND
NO EFFECT IS OBTAINED.
```

```
1890 LET H=GROUP(FIXZERO,KICKOUT)
1900 LET NEWGROUP=1-OLDGROUP(H)
1910 REM COMPLAINTS REMOVED FROM KERNEL GROUP ARE CLASSIFIED INTO OPPOSITE GROUP.
1920 GOSUB 2740
1930 LET KICKOUT=KICKOUT-1
1940 REM IF NO EFFECT IS OBTAINED, (KICKOUT)TH MEMBER IS REMOVED FROM KERNEL GROUP.
1950 IF KICKOUT>0 THEN 1630
1960 REM NO IMPROVEMENT IS OBTAINED EVEN IF ALL MEMBERS OF KERNEL GROUP ARE REMOVED.  CAUTION.
1970 LET WARNING=WARNING+1
1980 LET KICKOUT=GROUPSIZE(FIXZERO)+1
1990 REM IF NECESSARY, SHIFT KERNEL MEMBERS TO OPPOSITE
2000 REM GROUP.  FOR EXAMPLE, EVEN IF KERNEL MEMBER IS SHIFTED TO GROUP WITHOUT VIOLATION, NO EFFECT IS OBTAINED; THEN SHIFT IT TO GROUP WITH VIOLATION.
2010 GOTO 1630
2020 REM DELTAC IS REGARDED AS VALID.  CALCULATION OF LET PROGC=PROGC-W*DELTAC. W
2030 LET W=1E+50
2040 REM INITIAL VALUE OF W
2050 REM DELTAC DOES NOT INFLUENCE KERNEL MEMBER.  UNTIL
2060 REM MEMBER WITH OR WITHOUT VIOLATION IS PLOTTED NEAR BOUNDARY, IT IS VALID.  CDELTAC(H) IS -D(V(H))/D(W), I.E., DELTAC OLDDIF(H,*).
2070 FOR H=1 TO NUMCLAIMS
2080 LET CDELTAC(H)=0
2090 IF MYGROUP(H)=FIXZERO THEN 2250
2100 REM REMOVE KERNEL MEMBERS
2110 FOR J=1 TO N
2120 LET CDELTAC(H)=CDELTAC(H)+DELTAC(J)*OLDDIF(H,J)
2130 NEXT J
2140 LET PLSMIN=2*MYGROUP(H)-1
2150 REM PLSMIN IS SIGN OF GROUP TO WHICH HTH COMPLAINT BELOWS.
2160 IF SGN(CDELTAC(H))<>PLSMIN THEN 2250
2170 REM IF CDELTAC HAS THE SAME SIGN AS GROUP, IT DOES NOT COME NEAR BOUNDARY WITH GROUP WITH VIOLATION.
2180 LET TRYW=V(H)/CDELTAC(H)
2190 REM IF W IS SET TO BE TRYW, V(H) IS 0.  SELECT MINIMUM TRYW.
2200 IF TRYW>W THEN 2250
2210 REM TRYW IS THE MINIMUM VALUE OBTAINED SO FAR.
2220 LET W=TRYW
2230 LET STOPH=H
2240 REM STOPH IS H CAUSING MINIMUM TRYW.
2250 NEXT H
2260 PRINT "W=";W;"STOPH=";STOPH
2270 REM DEBUG IS REQUIRED.
2280 REM DEBUG PROGC.
2290 FOR J=1 TO N
2300 LET PROGC(J)=PROGC(J)+W*DELTAC(J)
2310 NEXT J
2320 REM DEBUG V.  IF SIGN IS REVERSED TO THAT OF GROUP,
```

```
2330 REM DEBUG IS INHIBITED AS IT CAUSES ERRORS.  OTHERWISE,
TROUBLE OCCURS IN W.
2340 PRINT "V=";
2350 FOR H=1 TO NUMCLAIMS
2360 IF MYGROUP(H)=FIXZERO THEN 2400
2370 LET PLSMIN=2*MYGROUP(H)-1
2380 LET V(H)=V(H)-W*CDELTAC(H)
2390 IF V(H)<>0 AND SGN(V(H))=-FUGOO THEN PRINT
V(H);"-->";:LET V(H)=0
2400 REM IF COMPLAINT BELONGS TO KERNEL, JUMP TO THIS LINE.
2410 PRINT V(H);
2420 NEXT H
2430 PRINT
2440 REM AS (STOPH)TH COMPLAINT HITS 0, IT IS REMOVED FROM
THE GROUP TO WHICH IT BELONGED.
2450 LET V(STOPH)=0
2460 IF HITZERO(STOPH)=0 THEN LET NEWGROUP=1-MYGROUP(STOPH)
ELSE LET NEWGROUP=FIXZERO
2470 REM IF COMPLAINT HITS 0 FOR THE FIRST TIME, IT IS
CLASSIFIED INTO OPPOSITE GROUP.  OTHERWISE, CLASSIFY INTO
KERNEL GROUP.
2480 LET HITZERO(STOPH)=HITZERO(STOPH)+1
2490 REM WRITE THAT COMPLAINT HITS 0.
2500 LET H=STOPH
2510 GOSUB 2740
2520 IF N<=GROUPSIZE(FIXZERO) THEN 1870
2530 REM IF KERNEL MEMBER NUMBER REACHES N, DECREMENT THE
COUNT.
2540 IF W=0 THEN 1630
2550 REM WRITE ONLY SHIFTING WHICH HAS PROVIDED EFFECT.
2560 LET WARNING=0
2570 LET KICKOUT=GROUPSIZE(FIXZERO)
2580 GOTO 1630
2590 REM PROGC TO ACTC IS COMPARED BY INNER PRODUCT.
2600 LET ACT2=0
2610 LET PROG2=0
2620 LET ACTPROG=0
2630 FOR J=1 TO N
2640 LET PROG2=PROG2+PROGC(J)^2
2650 REM PROG2 IS THE SQUARE OF ABSOLUTE VALUE OF PROGC.
ACT2 IS ALSO THE SQUARE OF ACTC.
2660 LET ACT2=ACT2+ACTC(J)^2
2670 LET ACTPROG=ACTPROG+ACTC(J)*PROGC(J)
2680 NEXT J
2690 PRINT "TRY=";TRY,"COS=";ACTPROG/SQR(ACT2*PROG2),
"NUMCLAIMS=";NUMCLAIMS
2700 REM BETTER RESULTS ARE OBTAINED IF COS COMES NEARER 1.
2710 REM BEEP?
2720 NEXT TRY
2730 END
2740 REM
2750 REM    * * * * GROUP TRANSFER SUBROUTINE * * * *
2760 REM
2770 REM HTH RESTRICTION STATEMENT IS TRANSFERRED TO
(NEWGROUP)TH GROUP.
```

```
2780 REM REMOVE IT FROM GROUP TO WHICH IT CURRENTLY BELONGS.
2790 LET OLDGROUP(H)=MYGROUP(H)
2800 LET OLDNUMBER=MYNUMBER(H)
2810 LET GROUP(MYGROUP(H),MYNUMBER(H))=GROUP(MYGROUP(H),GROUPSZIE(MYGROUP(H)))
2820 LET MYNUMBER(GROUP(MYGROUP(H),MYNUMBER(H)))=MYNUMBER(H)
2830 REM ASSIGN MEMBERSHIP NO. OF SUBSCRIBER TO MOST RECENT MEMBER.
2840 LET GROUPSIZE(MYGROUP(H))=GROUPSIZE(MYGROUP(H))-1
2850 REM CLASSIFY IT INTO NEW GROUP.  IF NOT, GOSUB.
2860 LET GROUPSIZE(NEWGROUP)=GROUPSIZE(NEWGROUP)+1
2870 LET MYGROUP(H)=NEWGROUP
2880 LET MYNUMBER(H)=GROUPSIZE(NEWGROUP)
2890 LET GROUP(NEWGROUP,GROUPSIZE(NEWGROUP))=H
2900 RETURN
2910 REM
2920 REM     * * * * * ORTHOGONAL MAPPING SUBROUTINE * * * * *
2930 REM
2940 REM OLDDIF(KERNEL(H),*) is KERNEL.  H=1,...,KERNELSIZE. *=1,...,N.
2950 REM DELTAC(*) IS PROPOSAL FOR IMPROVING PROGC(*).
2960 REM DELTAC(*) IS ORTHOGONALLY MAPPED WITH KERNEL.  THAT
2970 REM IS, CHANGE IN DELTAC(*) IS MINIMIZED AND IPROGC(*) IS CHANGED BY A MULTIPLE OF DELTAC(*) SO AS NOT TO INFLUENCE V(KERNEL(H)).
2980 REM INNER PRODUCT OF DELTAC(*) AND OLDDIF(KERNEL(H),*) IS SET TO BE 0.
2990 REM PREPARE WORK ARRAY.
3000 ERASE DIFDOT,ROWCHART,KERNEL
3010 LET KERNELSIZE=GROUPSIZE(FIXZERO)
3020 DIM DIFDOT(KERNELSIZE,KERNELSIZE),ROWCHART(KERNELSIZE,KERNELSIZE)
3030 DIM KERNEL(KERNELSIZE)
3040 FOR MEMBER=1 TO KERNELSIZE
3050 LET KERNEL(MEMBER)=GROUP(FIXZERO,MEMBER)
3060 NEXT MEMBER
3070 REM DIFDOT(I,J) IS INNER PRODUCT OF OLDDIF(KERNEL(I),*) AND OLDDIF(KERNEL(J),*).
3080 REM OLDDIF(0,*) IS RESTORED TO ORIGINAL DEFTAC(*).
3090 LET KERNEL(0)=0
3100 FOR K=1 TO N
3110 LET OLDDIF(0,K)=DELTAC(K)
3120 NEXT K
3130 REM PREPARE INNER PRODUCT TABLE.
3140 FOR I=0 TO KERNELSIZE
3150 FOR J=0 TO KERNELSIZE
3160 REM ROWCHART(I,J) REPRESENTS A MULTIPLE OF
3170 REM OLDDIF(KERNEL(J),*) WHICH IS ADDED TO
3180 REM OLDDIF(KERNEL(I),*) SO AS TO ORTHOGONALLY MAP OLDDIF(KERNEL(I),*) WITH OLDDIF(KERNEL(BIFFERI),*).
3190 LET ROWCHART(I,J)=-(I=J)
3200 LET ROWCHART(J,I)=ROWCHART(I,J)
3210 LET ONEDOT=0
3220 REM ONEDOT IS ONE INNER PRODUCT.
```

```
3230 FOR K=1 TO N
3240 LET ONEDOT=ONEDOT+OLDDIF(KERNEL(I),K)*OLDDIF(KERNEL(J),K)
3250 NEXT K
3260 LET DIFDOT(I,J)=ONEDOT
3270 LET DIFDOT(J,I)=ONEDOT
3280 NEXT J
3290 NEXT I
3300 LET FIRSTDOT=DIFDOT(0,0)
3310 REM FIRSTDOT IS DELTAC DELTAC PRIOR TO ORTHOGONAL MAPPING.
3320 FOR I=KERNELSIZE TO 1 STEP -1
3330 FOR J=I-1 TO 0 STEP -1
3340 REM OLDDIF(KERNEL(J),*) IS ORTHOGONALLY MAPPED WITH
3350 REM OLDDIF(KERNEL(I),*). HOWEVER, OLDDIF IS NOT ACTUALLY CALCULATED BUT REPRESENTED BY ROWCHART AND DIFDOT.
3360 LET RATIO=DIFDOT(I,J)/DIFDOT(I,I)
3370 REM OLDDIF(KERNEL(J),*)=OLDDIF(KERNEL(J),*)-RATIO*OLDDIF(KERNEL(I),*)
3380 REM K<I IS ROWCHART(I,K)=0 NOT FOR K=0 TO KERNELSIZE BUT FOR K=I TO KERNELSIZE.
3390 FOR K=I TO KERNELSIZE
3400 LET ROWCHART(J,K)=ROWCHART(J,K)-RATIO*ROWCHART(I,K)
3410 NEXT K
3420 REM K>I IS DIFDOT(I,K)=0 NOT FOR K=0 TO KERNELSIZE BUT FOR K=0 TO I.
3430 FOR K=0 TO I
3440 LET DIFDOT(J,K)=DIFDOT(J,K)-RATIO*DIFDOT(I,K)
3450 REM CHANGE ROW.
3460 NEXT K
3470 FOR K=0 TO I
3480 LET DIFDOT(K,J)=DIFDOT(K,J)-RATIO*DIFDOT(K,I)
3490 REM CHANGE COLUMN.
3500 NEXT K
3510 REM ROW AND COLUMN VALUES MUST BE INDEPENDENTLY CALCULATED TO OBTAIN ACCURATE VALUES DIFDOT(J,J).
3520 NEXT J
3530 NEXT I
3540 REM DELTAC(*) IS SUBJECTED TO ORTHOGONAL MAPPING. ORIGINAL DELTAC(*) IS LEFT IN OLDDIF(0,*).
3550 LET LASTDOT=0
3560 REM LASTDOT=DELTAC DELTAC FOR CONFIRMATION
3570 FOR J=1 to N
3580 FOR I=1 to KERNELSIZE
3590 LET DELTAC(J)=DELTAC(J)+ROWCHART(0,I)*OLDDIF(KERNEL(I),J)
3600 NEXT I
3610 LET LASTDOT=LASTDOT+DELTAC(J)*DELTAC(J)
3620 NEXT J
3630 PRINT "KERNELSIZE=";KERNELSIZE
3640 RETURN
```

```
1 '*************************************************
2 '*        PROGRM   --- TV.BAS (TEST)              *
3 '*        FUNCTION --- MAIN                       *
4 '*------------------------------------------------*
5 '*                              1985/3/12         *
6 '*                              SINWA SYSTEM PRODUCTS *
7 '*************************************************
110 DEFINT A-Z
120 REM MAIN PROGRAM FOR ACCESSING PROGRAM FOR TELEVISION PROGRAM SELECTION
130 REM FOR EXITING ALL SUBPROGRAMS TO END AT RUN "TV.BAS"
140 REM 3-BYTE KANJI MODE SELECTION
150 PRINT CHR$(&H1B);"0";
160 REM CHECK IF PRINTER IS PROPERLY CONNECTED.
170 COLOR 4
180 IF (INP(&H62) AND 76)=72 THEN 250
190 PRINT "PREPARE THE PRINTER"
200 PRINT "IF PREPARED, PRESS RETURN"
210 PRINT "IF NOT PREPARED, PRESS ANOTHER KEY"
220 BEEP
230 IF INPUT$(1)<>CHR$(13) THEN END
240 GOTO 170
250 COLOR 7
260 REM END IS NOT REPRESENTED BY PROGRAM NAME BUT BY MARK AT THE END OF DATA.
270 LET PRORAMSUU=0
280 REM COUNT NO. OF PROGRAMS
290 READ PROGRAMMEI$
300 LET PROGRAMSUU=PROGRAMSUU+1
310 IF PROGRAMMEI$="END" THEN 350
320 REM NO. OF ITEMS IS NOT DETECTED YET AND READ DUMMY DATA.
330 READ DUMMY$
340 GOTO 280
350 REM NO. OF ITEMS IS DETECTED.  PROGRAMSUU.
360 DIM PROGRAMMEI$(PROGRAMSUU),FILEMEI$(PROGRAMSUU)
370 CLS 1
380 REM DELETE SCREEN AND READ DATA AGAIN.
390 RESTORE
400 FOR PROGRAMBANGOO=1 TO PROGRAMSUU
410 READ PROGRAMMEI$(PROGRAMBANGOO),FILEMEI$(PROGRAMBANGOO)
420 NEXT PROGRAMBANGOO
430 DATA INDIVIDUAL SUBSCRIBER TV PROGRAM LIST CREATED, NOT CREATED
440 DATA INDIVIDUAL SUBSCRIBER TV PROGRAM LIST CORRECTED, NOT CORRECTED
450 DATA SUBSCRIBER DATA REGISTRATION/CHECK (CORRECTION), EDITADR.BAS
460 DATA TV PROGRAM DATA REGISTRATION, EDITTV.BAS
470 DATA WITHDRAWN SUBSCRIBER PROCESSING (TRANSFER TO WITHDRAWAL/WITHDRAWN MEMBERSHIP LIST), NOT EDITED
480 DATA COMPLAINT HANDLING, NOT HANDLED
490 DATA END, NOT END
```

```
500 REM COLOR INITIALIZATION
510 LET GREEN=2
520 LET RED=4
530 LET YELLOW=6
540 LET WHITE=7
550 LET SKY=3
560 LET PURPLE=5
570 REM
580 REM OPERATOR SELECTS JOB OR GYOOMU.
590 CLS 1
600 REM DELETE SCREEN.
610 PRINT
620 COLOR WHITE
630 LOCATE 21,3
640 PRINT "TV PROGRAM LIST AUTOMATIC EDITING PROGRAM MENU"
650 FOR PROGRAMBANGOO=1 TO PROGRAMSUU
660 COLOR RED
670 PRINT
680 PRINT TAB(19);"♦   ";
690 COLOR GREEN
700 PRINT PROGRAMMEI$(PROGRAMBANGOO);
710 COLOR YELLOW
720 PRINT TAB(65);PROGRAMBANGOO
730 NEXT PROGRAMBANGOO
740 PRINT
750 LOCATE 23,2*PROGRAMSUU+5
760 COLOR YELLOW
770 PRINT "SELECT ANY NUMBER"
780 COLOR WHITE
790 REM FOR PREPARING FOR STRANGE INPUT
800 ON ERROR GOTO 950
810 LINE INPUT PROGRAMBANGOO$
820 LET PROGRAMBANGOO=VAL(PROGRAMBANGOO$)
830 REM ERROR PROCESSING CANCELLING.
840 ON ERROR GOTO 0
850 IF PROGRAMBANGOO>=1 AND PROGRAMBANGOO<=PROGRAMSUU THEN 970
860 REM STRANGE INPUT IS DETECTED.
870 PRINT
880 COLOR RED
890 PRINT TAB(23);"TYPE ACCURATE NUMBER"
900 BEEP
910 LOCATE 50,2*PROGRAMSUU+5
920 REM REMOVE INVALID INPUTS.
930 PRINT SPACE$(10+LEN(PROGRAMBANGOO$));
940 GOTO 750
950 REM COUNTERMEASURES FOR STRANGE INPUTS CAUSING ERRORS
960 RESUME 860
970 REM START EXECUTING PROPER PROGRAM.
980 CLS 1
990 IF PROGRAMMEI$(PROGRAMBANGOO)="END" THEN 1100
1000 IF FILEMEI$(PROGRAMBANGOO)<>"NOT CREATED" THEN RUN FILEMEI$(PROGRAMBANGOO)
```

```
1010 REM PROGRAM HAS NOT BEEN CREATED YET.
1020 COLOR RED
1030 LOCATE 20,10
1040 PRINT "THIS PROGRAM HAS NOT BEEN CREATED YET."
1050 BEEP
1060 FOR I=1 to 10000
1070 REM WAIT TIME
1080 NEXT I
1090 RUN
1100 REM END
1110 LOCATE 20,10
1120 COLOR SKY
1130 PRINT "THANK YOU"
1140 COLOR WHITE
1150 END
```

What is claimed is:

1. An apparatus for providing an individual television program table wherein television channels and corresponding time intervals are listed for each individual, comprising;

record reading means for reading subscriber taste data obtained from a questionnaire and in response developing subscriber taste data signals;

means for evaluating television programs in accordance with predetermined criteria to obtain program evaluation data;

linear programming means responsive to said subscriber taste data signals and said program evaluation data for generating optimal program list data;

printer means for printing from said optimal program list data a program list on a recording medium;

feedback means for inputting complaints on the program list from a subscriber and, in response, modifying said program evaluation data to improve prediction reliability of a subsequent program list to be printed by said printer; and setting means for setting a television or video cassette recorder in accordance with the program list.

2. In a device for printing out an individual television program table, said table comprising a list in units of time intervals and channel numbers in a form optimal for each subscriber by selecting optimal programs from among all available television programs, a method of editing the program table, comprising the steps of;

evaluating questionnaires showing subscriber taste in television programs to obtain taste evaluation questionnaires;

evaluating television programs to obtain television program evaluations;

applying a linear program to the subscriber taste evaluations and television program evaluations to obtain optimal individual subscriber program data;

storing the optimal individual subscriber program data;

printing out the stored optimal individual subscriber program data in the form of an individual subscriber program list;

receiving complaints from a subscriber when the subscriber makes complaints on the printed program list;

feeding back the complaints to be included in the linear program to increase prediction reliability of a subsequent program list; and reading the program list to automatically set a television set or video tape recorder.

3. In a device for printing out an individual television program table, said table comprising a list in units of time intervals and channel numbers in a form optimal for each subscriber by selecting optimal programs from among all available television programs, a method of editing the program table, comprising the steps of;

evaluating questionnaires showing subscriber taste in television programs to obtain taste evaluation questionnaires;

evaluating television programs to obtain television program evaluations;

applying a linear program to the subscriber taste evaluations and television program evaluations to obtain optimal individual subscriber program data;

storing the optimal individual subscriber program data;

printing out the stored optimal individual subscriber program data in the form of an individual subscriber program list;

receiving complaints from a subscriber when the subscriber makes complaints on the printed program list;

feeding back the complaints to be included in the linear program to increase prediction reliability of a subsequent program list; and editing the printed individual subscriber program list to control a program rating of a television set or a video tape recorder.

* * * * *